(12) United States Patent
Zheng et al.

(10) Patent No.: US 12,173,506 B2
(45) Date of Patent: Dec. 24, 2024

(54) ROOF SYSTEM

(71) Applicant: 2ND CONSTRUCTION CO., LTD OF CHINA CONSTRUCTION 5TH ENGINEERING BUREAU, Hefei (CN)

(72) Inventors: Zhitao Zheng, Hefei (CN); Hongliang Deng, Hefei (CN); Wenbing Shen, Hefei (CN); Sheng Li, Hefei (CN); Chuang Li, Hefei (CN); Xin Li, Hefei (CN)

(73) Assignee: 2ND CONSTRUCTION CO., LTD OF CHINA CONSTRUCTION 5TH ENGINEERING BUREAU, Hefei (CN)

( * ) Notice: Subject to any disclaimer, the term of this patent is extended or adjusted under 35 U.S.C. 154(b) by 0 days.

(21) Appl. No.: 18/757,451

(22) Filed: Jun. 27, 2024

(65) Prior Publication Data
US 2024/0352734 A1    Oct. 24, 2024

Related U.S. Application Data

(63) Continuation of application No. PCT/CN2023/138739, filed on Dec. 14, 2023.

(30) Foreign Application Priority Data

Apr. 18, 2023 (CN) .......................... 202310416840.5

(51) Int. Cl.
*E04D 3/30* (2006.01)
*E04D 11/00* (2006.01)
(Continued)

(52) U.S. Cl.
CPC .............. *E04D 3/30* (2013.01); *E04D 11/005* (2013.01); *E04D 13/0305* (2013.01);
(Continued)

(58) Field of Classification Search
CPC ..... E04D 3/30; E04D 11/005; E04D 13/0305; E04D 13/0409; E04D 13/103; H02S 20/23
See application file for complete search history.

(56) References Cited

U.S. PATENT DOCUMENTS 4,757,655 A * 7/1988 Jentoft ................ E04D 13/0305
                                           52/204.591
RE32,915 E * 5/1989 Jentoft ................ E04D 13/0305
                                            52/200
(Continued)

FOREIGN PATENT DOCUMENTS

| CN | 104120836 A | 10/2014 |
|---|---|---|
| CN | 205189273 U | 4/2016 |

(Continued)

OTHER PUBLICATIONS

GB5009-2012, Load Code for the Design of the Building Structures, China National Standarts, 2012, pp. 1-246, Ministry of Housing and Urban-Rural Development of the Peoples's Republic of China; General Administration of Quality Supervision, Inspection and Quarantine of the People's Republic of China.

*Primary Examiner* — Gisele D Ford
(74) *Attorney, Agent, or Firm* — Bayramoglu Law Offices LLC

(57) ABSTRACT

A roof system is provided. The roof system includes a roof body capable of forming a flat roof or a corrugated roof, where the roof body is provided on a roof pillar; a gutter system is provided at a valley position of the corrugated roof or on the flat roof; a skylight system is further provided at a pitched roof or a ridge of the corrugated roof or on the flat roof; and a pressure relief adjustment component is provided on the skylight system. According to the roof system, a plurality of roof modules are assembled into the roof body. Two adjacent ones of the roof modules are fixed by a (Continued)

connecting plate and a self-locking component when assembled. A plurality of reinforcing points work cooperatively, so the roof system achieves a high utilization rate, and ensures the overall stability and bearing capacity of the roof.

20 Claims, 15 Drawing Sheets

(51) Int. Cl.
 E04D 13/03 (2006.01)
 E04D 13/04 (2006.01)
 E04D 13/10 (2006.01)
 H02S 20/23 (2014.01)
(52) U.S. Cl.
 CPC ....... *E04D 13/0409* (2013.01); *E04D 13/103* (2013.01); *H02S 20/23* (2014.12)

(56) References Cited

U.S. PATENT DOCUMENTS

| | | | | |
|---|---|---|---|---|
| 8,713,864 B1* | 5/2014 | Smith, Jr. | ............... | E04D 3/364 52/203 |
| 9,781,884 B1* | 10/2017 | Iwai | ........................ | A01C 21/00 |
| 10,079,569 B1* | 9/2018 | Schneider | ............... | F24S 25/00 |
| 2010/0000165 A1* | 1/2010 | Koller | .................... | H02S 40/22 136/246 |
| 2012/0233942 A1* | 9/2012 | McLain | .................. | E04D 13/04 52/302.1 |
| 2015/0292209 A1 | 10/2015 | Kralic et al. | | |
| 2016/0083963 A1* | 3/2016 | Griffin | ................ | E04D 13/0315 52/200 |
| 2017/0202155 A1* | 7/2017 | Iwai | ........................... | E04B 7/18 |
| 2018/0248508 A1* | 8/2018 | Keller | .................... | H02S 40/34 |
| 2021/0071410 A1* | 3/2021 | Kralic | .................... | E04D 3/365 |
| 2021/0265939 A1* | 8/2021 | De Bie | ................ | F24S 25/615 |
| 2022/0090370 A1* | 3/2022 | Cope | .................. | E04D 13/031 |
| 2023/0137730 A1* | 5/2023 | Davis | ..................... | E04D 3/361 52/506.05 |
| 2023/0198453 A1* | 6/2023 | Keller | .................... | F24S 25/12 136/251 |

FOREIGN PATENT DOCUMENTS

| | | |
|---|---|---|
| CN | 209637119 U | 11/2019 |
| CN | 111910816 A | 11/2020 |
| CN | 213062662 U | 4/2021 |
| CN | 214169604 U | 9/2021 |
| CN | 114457964 A | 5/2022 |
| CN | 216428820 U | 5/2022 |
| CN | 218176365 U | 12/2022 |
| CN | 116446583 A | 7/2023 |

* cited by examiner

ROOF SYSTEM

CROSS REFERENCE TO THE RELATED APPLICATIONS

This application is a continuation application of International Application No. PCT/CN2023/138739, filed on Dec. 14, 2023, which is based upon and claims priority to Chinese Patent Application No. 202310416840.5, filed on Apr. 18, 2023, the entire contents of which are incorporated herein by reference.

TECHNICAL FIELD

The present disclosure relates to the technical field of roofs, and in particular to a roof system.

BACKGROUND

In recent years, roof structures have been widely applied to railway stations, airports, scientific research plants, and other large-span building structures for the advantages of light weight, desirable heat preservation effect, fast construction speed, etc. In large-scale steel roof projects, in order to make roof panels less lapped and the roof more integrated, and ensure water resistance and overall compression resistance of the roof, large-span metal roof panels are used extensively. Especially, profiled metal roof panels are advantageous for light weight, aesthetically-pleasing design, convenient and fast construction, etc. However, the large-span metal roof panels also have many problems from the prior art.

From construction quality of the roof, when the roof panels are mounted integrally, junctions are prone to loose connection and deformation. Components of the roof panels are connected mechanically by latching, engaging or clamping, with low stiffness. A wind uplift accident occurs in case of a strong wind load or an ordinary wind load at a special wind vibration frequency. For example, the Chinese Patent Application (CN218176365U) provides a metal roof panel reinforcing and buckling structure. Specifically, "the metal roof panel reinforcing and buckling structure includes a ridge buckling cover and a ridge connecting piece. An elastic traction device for drawing lateral plates at two sides of the ridge buckling cover inward is provided inside the ridge buckling cover. Through the elastic traction device inside the ridge buckling cover, the lateral plates at the two sides of the ridge buckling cover are drawn inward. In cooperation with a fastener on the ridge buckling cover, the utility model can improve a connection strength between the ridge buckling cover and the ridge connecting piece, and lower a risk that the ridge buckling cover is blown away by a gale". According to this technology, the wind uplift resistance of the metal roof panels can be improved to some extent, but the metal roof panels are provided densely in a multi-point form and take an independent action at each point. The metal roof panels at fixed points cannot work cooperatively with low stability, and are likely to fall off in extreme situations. In terms of the construction safety of roof, the existing roof panels are generally mounted by aloft work to accomplish the overall laying of roof. During the aloft work of constructors, the potential safety hazards occur frequently and the safety is poor. In the aloft work, accuracy control also becomes tricky.

A skylight is considered as a key component of the roof, and its wind resistance and seepage resistance are of great importance. The wind pressure distribution on a surface of the roof is mainly affected by a turbulence flow on the structure. At the highest point of the roof, airflow is separated and negative pressure is large. Through relevant simulations on wind pressure distributions of the roof in different directions, and according to the existing *Load Code for the Design of Building Structures* (GB 50009-2012), the negative pressure at the highest point of the roof is large. Compared with the skylight on a flat roof and the skylight on a sloping roof, the skylight at a ridge is stressed complicatedly, and is very prone to poor stability for the negative wind pressure. Consequently, the skylight is hard to resist the strong wind load to cause deformation, seepage, etc.

Corresponding wind-resistant and pressure relief treatment for the wind pressure on the roof remains unavailable in current markets, but a reinforcing structure is provided on the ridge in most cases. For example, the Chinese Patent Application (CN214169604U) provides a wind-resistant and snow-proof ridge structure for a metal roof. Specifically, "ridge caps are respectively fixed on two opposite upper profiled metal steel plates of the roof. The ridge cap matches with a slope valley of the upper profiled metal steel plate of the roof in shape. The ridge cap is connected to a slope peak of an upper surface of the upper profiled metal steel plate of the roof. The ridge cap is connected and fixed to a slope valley of the upper surface of the upper profiled metal steel plate of the roof. An end-to-end butyl tape is provided at a junction. A gap is formed between two butyl tapes. With the special-shaped ridge cap and metal outer ridge tile, the special butyl tape laying and the special connection, the utility model makes the ridge structure of the whole metal roof firmer, and can effectively solve slight air leakage and snow leakage". However, in case of windstorm and snowstorm weathers, the roof is hard to resist the wind load to cause deformation of the skylight at the ridge.

SUMMARY

A technical problem to be solved by the present disclosure is how to solve problems of poor construction quality and poor construction safety of a roof at present, as well as a problem that a skylight of the roof is affected by a wind pressure easily to cause deformation.

To solve the above technical problem, the present disclosure provides the following technical solutions:

A roof system includes a roof body capable of forming a flat roof or a corrugated roof, where the roof body is provided on a roof pillar; a gutter system is provided at a valley position of the corrugated roof or on the flat roof; a skylight system is further provided at a pitched roof or a ridge of the corrugated roof or on the flat roof; and a pressure relief adjustment component is provided on the skylight system; and the roof body is assembled by a plurality of roof modules; two adjacent roof modules along a roof span direction are assembled through a connecting plate; two ends of the connecting plate are respectively lapped on the two adjacent roof modules; the connecting plate and the roof module are fixed by a self-locking component; and two adjacent roof modules along a direction perpendicular to the roof span direction are also fixed by the self-locking component.

According to the present disclosure, a plurality of roof modules are assembled into the roof body. Two adjacent roof modules are fixed by the connecting plate and the self-locking component when assembled, thereby ensuring stability of the metal roof modules and overall stability of the roof. A plurality of reinforcing points work cooperatively, so the present disclosure achieves a high utilization rate, and ensures the overall stability and bearing capacity of the roof. Meanwhile, with a method for independently prefabricating the modules and then assembling the modules, the present disclosure is flexible in operation and convenient in mounting, and can accelerate a construction progress and ensure safety of constructors. With the self-locking component, the present disclosure can solve the problems of poor wind uplift resistance, poor mounting accuracy and poor construction safety of the roof panel in an inherent form, and make the whole roof system guarantee the wind resistance under a combined action of a support and various reinforcing members. The pressure relief adjustment component is provided on the skylight. The pressure relief adjustment component can effectively solve the problem of deformation at the ridge due to a large bearing capacity caused by a strong wind load. A resulting negative wind pressure is released through the pressure relief adjustment component when greater than a preset pressure, thereby ensuring the desirable bearing capacity of the skylight of the roof.

As a further solution of the present disclosure, the roof modules each sequentially include a support beam, a lower roof panel, reinforcing components, an upper roof panel, the self-locking component, and a solar component from bottom to top; the support beam is provided at a bottom of the lower roof panel; the reinforcing components are provided in a frame shape at a middle position of a top of the lower roof panel; a heat-preserving vapor barrier component is provided inside the reinforcing components and on the lower roof panel; the two ends of the connecting plate are respectively lapped on two adjacent upper roof panels; the connecting plate and the upper roof panel are fixed by the self-locking component; and a bridge reinforcing member is further clamped on the connecting plate and at a top of the upper roof panel.

As a further solution of the present disclosure, the self-locking component includes a support clamping groove and a fixed support; a contour of the fixed support matches with the support clamping groove; and edges at two sides of the upper roof panel are limited between the support clamping groove and the fixed support.

As a further solution of the present disclosure, the self-locking component further includes an outer clamping member and an inner clamping member; the outer clamping member includes an inner clamping groove; the inner clamping member includes a clamping key matching with the inner clamping groove; the clamping key is inserted into the inner clamping groove to enclose the support clamping groove; and a top protrusion of the outer clamping member wraps the inner clamping member from an upside of the inner clamping member.

As a further solution of the present disclosure, the fixed support includes a transverse locating plate and a vertical limiting rod perpendicular to the transverse locating plate; the vertical limiting rod is a gradually narrow structure from top to bottom; inclined triangular brackets at two sides of a bottom of the vertical limiting rod are fixed to the transverse locating plate; a top of the vertical limiting rod is a curved protrusion; a recessed segment and a raised segment are provided sequentially downward along two sides of the curved protrusion; and the multi-segment structure is integrally formed with the vertical limiting rod.

As a further solution of the present disclosure, the edges at the sides of the upper roof panel match with the vertical limiting rod in shape; the top of the upper roof panel is also a curved protrusion; a recessed segment and a raised segment are provided sequentially downward along two sides of the curved protrusion; and the multi-segment structure is integrally formed with the upper roof panel.

As a further solution of the present disclosure, a waterproof strengthening component is provided between two middle ones of the reinforcing components; the reinforcing components each include two fastening beams, sliding rods, and sliders; the two fastening beams are provided on the lower roof panel in parallel; a plurality of sliders are provided on each fastening beam; and two ends of each sliding rod are respectively detachably connected to sliders on the two fastening beams.

As a further solution of the present disclosure, a spacing between the two fastening beams is controlled by a first adjustment structure; and a spacing between two sliding rods is controlled by a second adjustment structure.

As a further solution of the present disclosure, the first adjustment structure includes serrated runners respectively provided on sidewalls at two ends of the sliding rod; a groove is formed in a top of the slider; the groove is fittingly connected to the sliding rod in a sliding manner; serrated pin holes are respectively formed at a front side and a rear side of the slider; and the serrated pin hole and the serrated runner are locked by a serrated pin; and the second adjustment structure includes a plurality of locating pin holes equidistantly formed at two sides of the fastening beam; a steel groove is formed in a bottom of the slider; the steel groove is connected to the fastening beam in a sliding manner; butterfly pin holes are further respectively formed at a left side and a right side of the slider; and the butterfly pin hole is locked with the locating pin hole in the fastening beam by a butterfly pin.

As a further solution of the present disclosure, the solar component includes two mounting stands provided at a top of the self-locking component in parallel; nested plates are respectively detachably provided on the mounting stands; and a solar panel is clamped in the nested plates.

As a further solution of the present disclosure, the skylight system includes a skylight; the pressure relief adjustment component is provided at each of four corner positions of the skylight; a pressure sensor is further provided on the skylight; the pressure relief adjustment component includes an inner nested rod and an outer sleeve; a top of the inner nested rod is connected to a square tube; a bottom of the outer sleeve is fixed to the roof body; a bottom of the inner nested rod is connected in the outer sleeve in a sliding manner; a pressure relief hole is formed in the outer sleeve; an upper portion of the outer sleeve is connected to the square tube through an elastic member; and a top of the square tube is fixed to the skylight.

As a further solution of the present disclosure, the pressure relief adjustment component further includes a single plate and a support plate; one end of the single plate is connected to the square tube through the support plate; the square tube is provided at a side of the skylight; a gasket is further provided at a contact position between the inner nested rod and the outer sleeve; the gasket is fixed on an inner wall of the outer sleeve; and the gasket is located under the pressure relief hole.

As a further solution of the present disclosure, four sides of the skylight each are provided with a first flashing; and a top of the first flashing is fixed to the outer sleeve.

As a further solution of the present disclosure, a bottom of each of the four sides of the skylight is fixed to the roof body through a first anti-seepage component; the first anti-seepage component includes a folded plate and a corner splicing member; the folded plate is located at the bottom of the side of the skylight; the folded plate includes one end fixed to the skylight, and the other end fixed to the roof body; and a corner splicing position between two adjacent folded plates is fixed by the corner splicing member.

As a further solution of the present disclosure, the folded plate includes a skylight welding portion, a vertical lapping portion, a fold protruding portion, and a roof welding portion that are formed integrally; the fold protruding portion and the roof welding portion are respectively provided at two ends of the folded plate; the skylight welding portion is fixed to the bottom of the side of the skylight; the roof welding portion is fixed to the roof body; an end of the fold protruding portion is fixed to the corner splicing member; and the vertical lapping portion is provided between the fold protruding portion and the roof welding portion, and is arc-shaped to be fixed to the corner splicing member.

As a further solution of the present disclosure, the corner splicing member includes an upper connecting portion and a curved lapping portion; the upper connecting portion is provided at a top of the curved lapping portion; the upper connecting portion includes two welding edges perpendicular to each other; the two welding edges are fixed to bottoms of two sides of the skylight; and the curved lapping portion is connected to two adjacent folded plates.

As a further solution of the present disclosure, the skylight system on the pitched roof further includes a second anti-seepage component provided at a junction between the skylight and an upslope of a sloping roof; the second anti-seepage component includes an anti-seepage plate and an anti-seepage splicing plate; and the anti-seepage plate includes one end connected to a side of the skylight, and the other end fixed to the roof body through the anti-seepage splicing plate.

As a further solution of the present disclosure, the gutter system includes a gutter provided at a valley position of an arched roof or on the flat roof; a thermal conductive plate is provided on an inner bottom wall of the gutter; a cornice snow melting component is provided at an upper cornice of the gutter; a rainwater inlet is formed in the inner bottom wall of the gutter; a water pressure monitor is provided on a sidewall of the gutter; a siphonic roof drain is provided at the rainwater inlet; a gutter snow melting component is further provided inside the gutter; and a downspout heat tape is further provided in the siphonic roof drain.

As a further solution of the present disclosure, the siphonic roof drain includes a conical drainage portion, a gasket, an oblique spiral portion, and a water outlet; the gasket further includes an expandable layer and a honeycomb waterproof layer; the expandable layer is located outside the honeycomb waterproof layer; a top of the oblique spiral portion is provided with the conical drainage portion; the gasket is located outside the oblique spiral portion; the oblique spiral portion communicates with the bottom water outlet; the water outlet is inserted into a downspout at a bottom of the gutter; the downspout heat tape is provided in the downspout; a junction box is provided on an inner wall of the gutter; and the downspout heat tape is connected to the junction box.

As a further solution of the present disclosure, the gutter snow melting component includes a gutter heat tape and a "snakelike" groove formed in the thermal conductive plate; and the gutter heat tape is provided in the groove.

As a further solution of the present disclosure, the gutter snow melting component includes an intelligent spraying member; the intelligent spraying member includes a tube, a plurality of high-pressure nozzles, an automatic spraying control module, and a snowfall sensor; the plurality of high-pressure nozzles are equidistantly arranged on the sidewall of the gutter; the plurality of high-pressure nozzles communicate with each other through the tube; the automatic spraying control module and the snowfall sensor are provided on an end of the sidewall of the gutter; and one end of the tube communicates with a snow-removing agent box.

As a further solution of the present disclosure, the cornice snow melting component is provided at a top of the roof and the upper cornice of the gutter; the cornice snow melting component includes a cornice cap, an insulating layer, a thermal conductive gasket, a heating cable, and a second flashing; the cornice cap is located on an end of the roof; the thermal conductive gasket and the insulating layer are sequentially provided on the end of the roof; the heating cable is located on the thermal conductive gasket; and the second flashing is provided under the cornice cap.

Compared with the prior art, the present disclosure has the following beneficial effects:

1. According to the present disclosure, a plurality of roof modules are assembled into the roof body. Two adjacent roof modules are fixed by the connecting plate and the self-locking component when assembled, thereby ensuring stability of the metal roof modules and overall stability of the roof. A plurality of reinforcing points work cooperatively, so the present disclosure achieves a high utilization rate, and ensures the overall stability and bearing capacity of the roof. Meanwhile, with a method for independently prefabricating the modules and then assembling the modules, the present disclosure is flexible in operation and convenient in mounting, and can accelerate a construction progress and ensure safety of constructors. With the self-locking component, the present disclosure can solve the problems of poor wind uplift resistance, poor mounting accuracy and poor construction safety of the roof panel in an inherent form, and make the whole roof system guarantee the wind resistance under a combined action of a support and various reinforcing members. The pressure relief adjustment component is provided on the skylight. The pressure relief adjustment component can effectively solve the problem of deformation at the ridge due to a large bearing capacity caused by a strong wind load. A resulting negative wind pressure is released through the pressure relief adjustment component when greater than a preset pressure, thereby ensuring the desirable bearing capacity of the skylight of the roof.

2. According to the present disclosure, two sides of two adjacent lower roof panels are locked by the self-locking component. The outer clamping member can wrap the inner clamping member externally, and the protrusion of the inner clamping member is clamped with the outer clamping member, thereby ensuring self-locking between the inner clamping member and the outer clamping member. Meanwhile, the fixed support is further provided inside the inner clamping member and inside the outer clamping member. The fixed support can support bottoms of two sides of the lower roof panel. The inner clamping member and the outer clamping member lock the lower roof panel externally, thereby ensuring stability of the lower roof panel in mounting, and improving wind resistance of the lower roof panel. The fixed support is a gradually narrow structure from top to bottom, with an upper section greater than a lower section. The side of the roof panel is also a gradually narrow structure from top to bottom. The fixed support and the lower roof panel match with each other, which can effectively resist a negative pressure effect caused by a wind load (namely resists an uplift force). Meanwhile, the lower small-section portion of the fixed support is provided with the inclined triangular bracket, thereby effectively ensuring compression resistance of the support, and reinforcing the lower roof panel before the lower roof panel is damaged. Therefore, the present disclosure solves the problems of poor wind uplift resistance, poor mounting accuracy and poor construction safety of the roof panel in the inherent form, makes the whole metal roof system guarantee the wind resistance under the combined action of the support and various reinforcing members, and greatly improves the structural strength, stiffness and wind resistance of the roof panel.

3. A plurality of locating pin holes are equidistantly formed at two sides of the fastening beam. The slider is slidable on the fastening beam. Butterfly pin holes corresponding to the locating pin holes are formed in the slider. Hence, the fastening beam and the slider can be fixed through a butterfly pin. The slider can be adjusted by controlling the butterfly pin, and the upper roof panel can move relatively on the fastening beam, thereby realizing connection between adjacent roof panels. With high flexibility, strong practicability and simple mounting, the present disclosure can greatly accelerate a construction speed.

4. According to the present disclosure, the top of the slider can be connected to the sliding rod in a sliding manner. The serrated pin hole is formed in the slider. The corresponding serrated runner is provided on the sliding rod. A serrated pin can be clamped into the serrated runner through the serrated pin hole. This realizes locking between the slider and the sliding rod, and can further make fine adjustment on the sliding rod to prevent dead locking between the slider and the sliding rod. The present disclosure facilitates adjustment of the position, namely adjusts a spacing between two fastening beams for different lower roof panels, such that the present disclosure can be applied to the lower roof panels of different sizes, and ensures efficient connection of the subsequent roof panel. With high flexibility, strong practicability and simple mounting, the present disclosure can greatly accelerate a construction speed.

5. According to the present disclosure, the heat-preserving vapor barrier component is provided at a gap between the fastening beam and the sliding rod. The heat-preserving vapor barrier component sequentially includes a vapor barrier layer, a heat preservation layer, and a waterproof layer from top to bottom. The fastening beam, the sliding rod and the fixed support can support the upper roof panel, such that the heat-preserving vapor barrier component is not stressed directly, thereby ensuring the structural stability. In case of an external pressure, the pressure mainly acts on the support and the fastening component, thereby improving the integrity.

6. According to the present disclosure, the slidable sleeve pressure relief component is provided at each of four corner positions of the skylight. The sleeve pressure relief component can effectively solve the problem of deformation at the ridge due to a large bearing capacity caused by a strong wind load. Meanwhile, the pressure relief hole is formed in the outer sleeve. The elastic member cooperates with the pressure sensor. When the resulting negative wind pressure is greater than a preset pressure of the pressure relief device, the pressure relief adjustment device is started to release the pressure. Upon completion of pressure relief, the elastic member generates a pulling effect to shut down the pressure relief adjustment device timely. When the resulting negative wind pressure is less than the preset pressure of the pressure relief device, the skylight is damaged possibly. By this time, the pressure relief device is ejected by the elastic member, and the pressure relief adjustment device is started to release the pressure, thereby ensuring the desirable bearing capacity of the skylight at the ridge.

7. According to the present disclosure, four sides of the skylight are spliced to the roof integrally by a horizontal folded plate. With the horizontal folded plate, the present disclosure greatly increases a contact area at the spliced position, and makes contact firmer. Meanwhile, the horizontal fold extends a water seepage path at a junction between the skylight and the roof. Therefore, the present disclosure can drain rushing water timely in rainstorm and snowstorm weathers, and effectively improve waterproofness at a junction between the skylight and the metal roof panel.

8. By providing the C-shaped anti-seepage plate at the junction between the skylight and the upslope of the pitched roof, and in cooperation with the flashing, the present disclosure moves an easy-to-seep point upward, and effectively solves a seepage phenomenon due to rainwater accumulation at the junction between the skylight and the upslope of the roof in rainstorm and snowstorm weathers. The S-shaped anti-seepage splicing plate is provided between the C-shaped anti-seepage plate and the roof. With the S-shaped anti-seepage splicing plate, the present disclosure ensures smooth transition at the junction, and reduces misalignment due to stress concentration. The C-shaped anti-seepage plate and the S-shaped anti-seepage splicing plate are connected to the roof by a rivet, with a junction obstructed by a sealant. This reduces a contact area between the C-shaped anti-seepage plate and the roof, and makes connection firmer.

9. Since the cornice snow melting component is provided at an upper cornice of the gutter, the gutter snow melting component is further provided inside the gutter, and the solar panel can provide electric energy for the cornice snow melting component and the gutter snow melting component, the present disclosure realizes snow melting at the upper cornice of the gutter and in the gutter. Meanwhile, the siphonic roof drain is provided at the rainwater inlet of the gutter. The downspout heat tape is provided in the siphonic roof drain. The gasket is provided on the siphonic roof drain. This prevents the siphonic roof drain from expanding with heat and contracting with cold for a temperature effect to cause separation of the siphonic roof drain from the bottom of the gutter to seep water. The present disclosure prevents the melting "ice piton" formed in winter at the upper cornice of the gutter from suddenly falling off to damage the gutter to cause water seepage of the gutter, and ensures all-around snow melting of the gutter. The present disclosure further solves the problems of poor coverage area of the snow melting, inconspicuous snow melting effect, poor energy saving, and the like of the gutter.

10. The thermal conductive plate with the "snake-like" groove is provided on the surface of the gutter body, and the heat tape is provided in the "snake-like" groove of the thermal conductive plate. This can increase a coverage area of the heat tape in the gutter, and solve problems of small area coverage, poor energy saving and the like for the heat generated by the heat tape on the surface of the gutter. The thermal conductive plate may be preferably made of a material with desirable thermal conductivity, such as metal and ceramic. The present disclosure can use the fewer heat tape to uniformly generate a large area of heat to cover the whole gutter, and melt the snow timely in the snowy weather. In case of a small area of the gutter, an area proportion of the thermal conductive plate with the "snakelike" groove can be reduced appropriately, and one "snakelike" groove is formed in the gutter. The present disclosure is intended to generate a large area of heat on the surface of the gutter with the fewer heat tape to save the energy and melt the snow timely.

11. The intelligent spraying member on the inner wall of the gutter can remove the snow in the gutter in winter, and cool the gutter in summer. The intelligent spraying member consists of a tube, a high-pressure nozzle, a snowfall sensor, and an automatic spraying control module. The tube is provided on inner walls at two sides of the gutter and at 0.1-0.3 mm above the bottom of the gutter. A plurality of high-pressure nozzles are provided on the tube. The high-pressure nozzles are uniformly arranged on the inner wall of the gutter at intervals. The tube is connected to the snowfall sensor and the automatic spraying control module at the same time. The snowfall sensor can sense an amount of snow and a temperature. In case of a snowfall in winter, when the temperature is less than 0° C., the snowfall sensor controls the automatic spraying control module to spray a snow-removing material (which may be saline water or a snow melting agent) upon receipt of a signal, and can further control a water spraying amount according to the amount of snow. Particularly in case of a sudden snowfall at midnight, the system works immediately to prevent the snow from icing in the gutter. In case of a hot weather in summer, the automatic spraying system can be controlled within a certain temperature range to spray clear water for cooling, thereby protecting the components, and prolonging the service life.

In the figures: 1: roof pillar, 2: roof body, 21: roof module, 211: support beam, 212: lower roof panel, 213: reinforcing component, 2131: fastening beam, 2132: sliding rod, 21321: serrated runner, 2133: slider, 21331: butterfly pin hole, 21332: butterfly pin, 21333: steel groove, 21334: serrated pin, 21335: serrated pin hole, 21336: groove, 214: upper roof panel, 215: heat-preserving vapor barrier component, 216: mounting stand, 217: solar panel, 218: self-locking component, 2181: outer clamping member, 2182: inner clamping member, 2183: fixed support, 219: nested plate, 22: connecting plate, 23: bridge reinforcing member, 24: waterproof strengthening component, 3: skylight system, 31: skylight, 32: pressure relief adjustment component, 321: square tube, 322: elastic member, 323: pressure relief hole, 324: support plate, 325: single plate, 326: inner nested rod, 327: outer sleeve, 33: first anti-seepage component, 331: folded plate, 3311: skylight welding portion, 3312: vertical lapping portion, 3313: fold protruding portion, 3314: roof welding portion, 332: corner splicing member, 3321: upper connecting portion, 3322: curved lapping portion, 34: first flashing, 35: pressure sensor, 36: second anti-seepage component, 361: anti-seepage plate, 362: anti-seepage splicing plate, 4: gutter system, 41: gutter, 42: siphonic roof drain, 421: conical drainage portion, 422: gasket, 4221: expandable layer, 4222: honeycomb waterproof layer, 423: oblique spiral portion, 424: water outlet, 43: cornice snow melting component, 431: cornice cap, 432: insulating layer, 433: thermal conductive gasket, 434: heating cable, 435: second flashing, 44: water pressure monitor, 46: downspout heat tape, 471: gutter heat tape, 472: intelligent spraying member, 4721: tube, 4722: high-pressure nozzle, 4723: automatic spraying control module, 4724: snowfall sensor, 48: junction box, 49: downspout, and 410: thermal conductive plate.

DETAILED DESCRIPTION OF THE EMBODIMENTS

In order to make the objectives, technical solutions, and advantages of embodiments of the present disclosure clearer, the following clearly and completely describes the technical solutions in the embodiments of the present disclosure with reference to the embodiments of the present disclosure. Apparently, the described embodiments are some rather than all of the embodiments. All other embodiments obtained by those of ordinary skill in the art based on the embodiments of the present disclosure without creative efforts should fall within the protection scope of the present disclosure.

Figure 1:
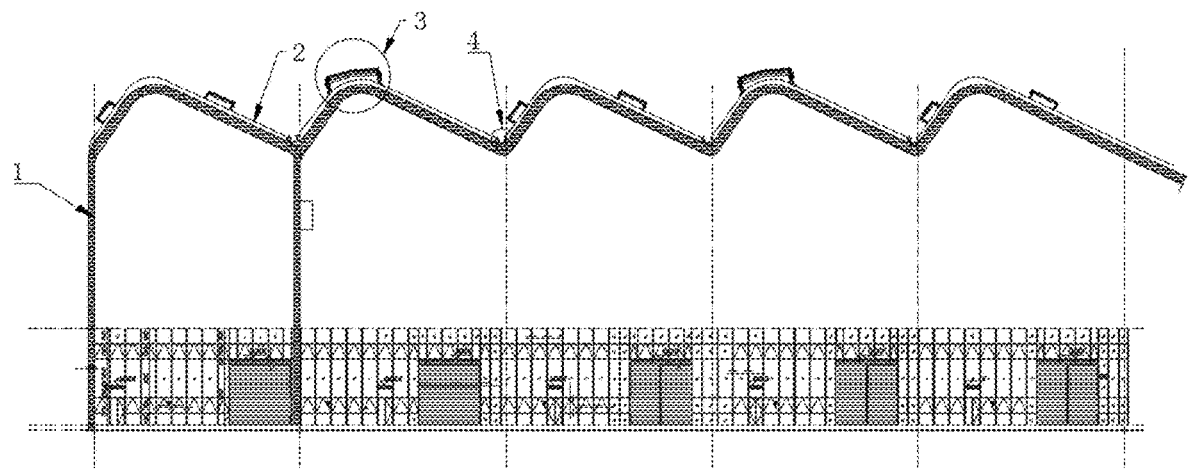
FIG. 1 is an overall structural view of a corrugated roof according to an embodiment of the present disclosure.

Referring to FIG. 1, a roof system includes roof body 2 capable of forming a flat roof or a corrugated roof. The roof shown in FIG. 1 includes a corrugated roof body formed by a plurality of arches. A valley position is provided between adjacent arches. The flat roof is a roof with a flat rooftop, and is commonly seen in plants at present. The roof body 2 is provided on roof pillar 1. The roof pillar 1 is a support pillar for constructing the roof body 2, and is constructed well before construction of the roof, which is a common technology at present. Gutter system 4 is provided at the valley position of the corrugated roof or on the flat roof. In case of a small flat roof, a gutter may be provided at an edge of the flat roof. In case of a large flat roof, a plurality of gutters may be provided at a middle of the roof, so as to realize drainage of the flat roof.

Referring to FIG. 1, skylight system 3 is further provided on the flat roof or a ridge or a pitched roof of the roof body 2. A specific mounting position of the skylight system 3 further depends on an environment and an actual situation of a construction site, an is not defined in the present disclosure. The present disclosure only provides several possibilities for the mounting position of the skylight system 3 (as shown by FIG. 1, in case of an arched roof, the skylight system 3 may be provided at the ridge or the pitched roof, with a specific number and a specific position depending on the actual situation). In case of the flat roof, the skylight system 3 is provided as needed.

Figure 2:
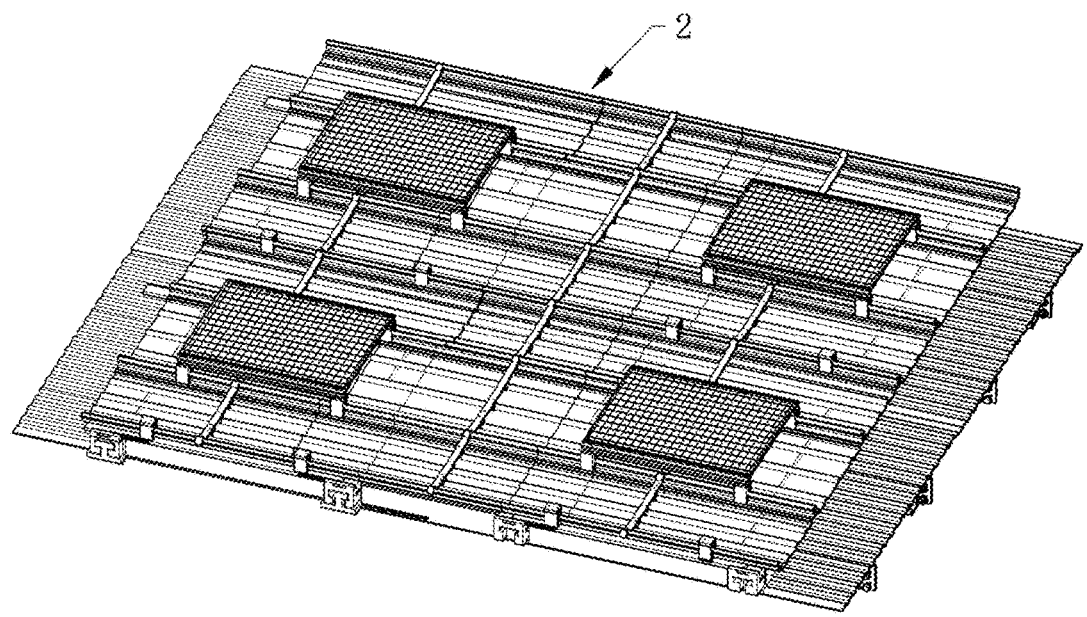
FIG. 2 is a partial structural view of a roof body of a flat roof according to an embodiment of the present disclosure.
Figure 3:
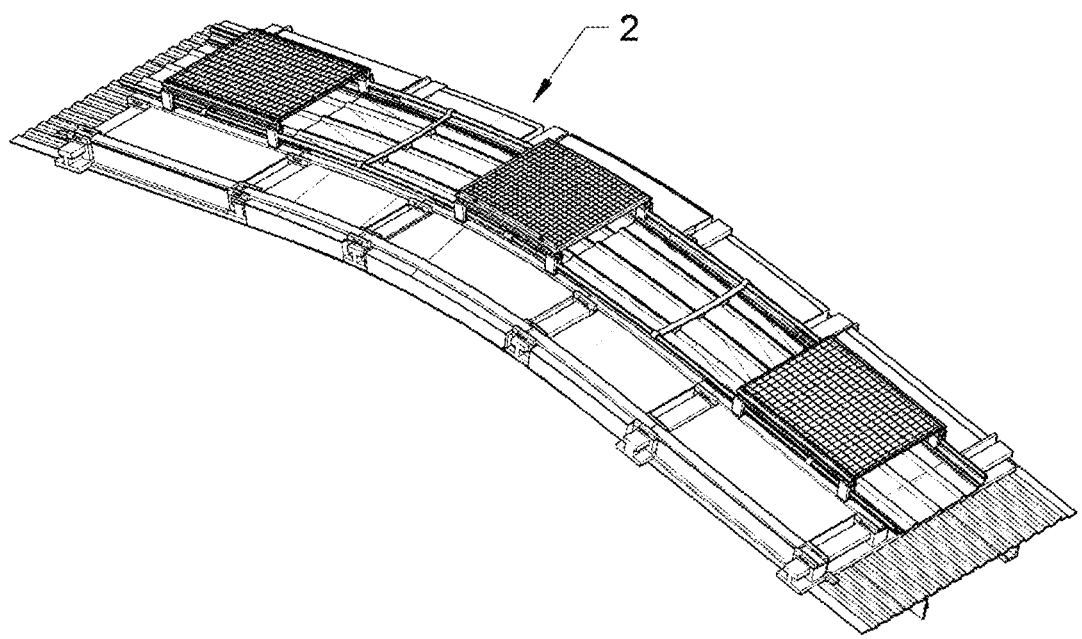
FIG. 3 is a partial structural view of a roof body of an arched roof according to an embodiment of the present disclosure.

Referring to FIG. 1, FIG. 2, FIG. 3 and FIG. 4, the roof body 2 in the present disclosure may be a metal roof and the like. The material of the roof body is not limited herein, and can depend on an actual mounting situation of the site. The roof body is assembled by a plurality of roof modules 21. FIG. 1 illustrates a view after three roof modules 21 are assembled integrally. FIG. 2 is a partial exploded view after three roof modules 21 are assembled. For ease of observation, FIG. 3 is a partial exploded view after a curved roof is assembled. It is to be noted that the roof includes the flat roof (as shown in FIG. 2) or the curved roof (as shown in FIG. 3) or the arched roof (as shown in FIG. 1). Hence, the plurality of roof modules 21 can be assembled into the flat roof or the curved roof or a combination of the flat roof and the curved roof. A specific number of the roof modules 21 depends on an actual size of the roof. During assembly, two adjacent roof modules 21 are assembled through connecting plate 22. Bridge reinforcing member 23 is clamped on the connecting plate 22.

Figure 5:
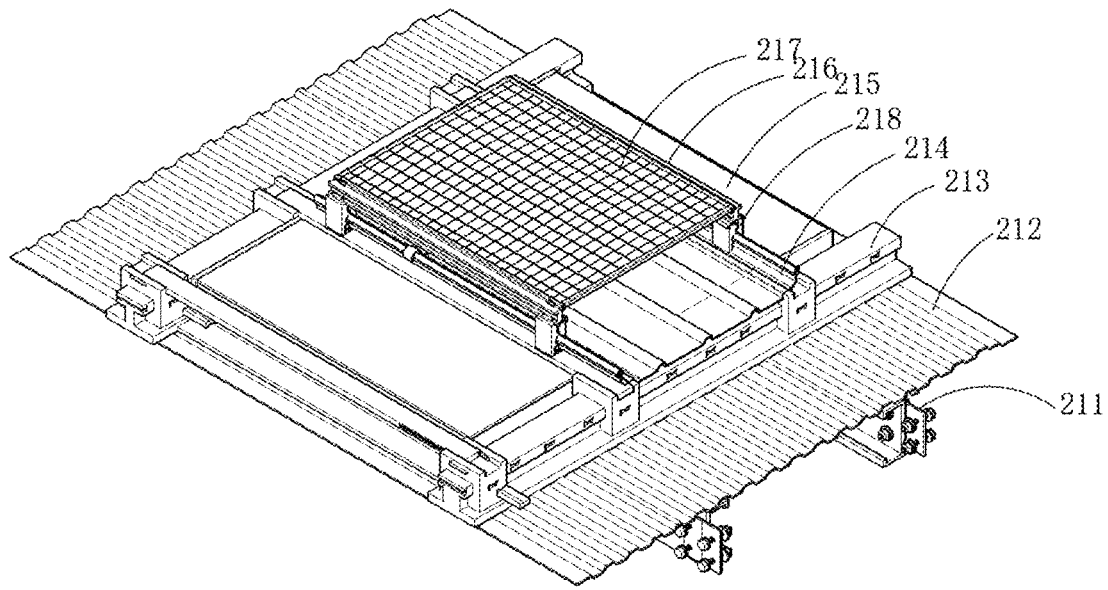
FIG. 5 is a partial structural view of a roof module according to an embodiment of the present disclosure.

Referring to FIG. 5, the roof modules 21 each include support beam 211, lower roof panel 212, reinforcing components 213, upper roof panel 214, heat-preserving vapor barrier component 215, mounting stand 216, solar panel 217, and self-locking component 218. The support beam 211 is lowest, and configured to connect the roof pillar 1, and support the lower roof panel 212 and a device on the lower roof panel together with the roof pillar 1. There may be two to three support beams provided along a span direction of the lower roof panel 212. The support beam and the lower roof panel 212 may be in bolted connection or welded to ensure stability of the support beam and the lower roof panel. The reinforcing components 213 are provided at a top of the lower roof panel 212. The heat-preserving vapor barrier component 215 is located between the reinforcing components 213 to take heat preservation and waterproof effects for the lower roof panel 212. The upper roof panel 214 is locked on the reinforcing components 213 through the self-locking component 218. The upper roof panel 214 is located at a top of the heat-preserving vapor barrier component 215. Two parallel mounting stands 216 are provided at a top of the self-locking component 218. The solar panel 217 is provided at tops of the two mounting stands 216.

It is to be noted that the heat-preserving vapor barrier component 215 includes a vapor barrier layer, a heat preservation layer, and a waterproof layer sequentially from bottom to top, and provides vapor barrier, heat preservation and waterproof effects for the lower roof panel 212 (The heat-preserving vapor barrier component 24 is structurally the same as waterproof strengthening component 215, and includes the vapor barrier layer, the heat preservation layer, and the waterproof layer sequentially from bottom to top). Meanwhile, the lower roof panel 212 uses a colored steel plate, and the upper roof panel 214 uses an aluminum-magnesium-manganese plate, which is the best choice.

Figure 4:
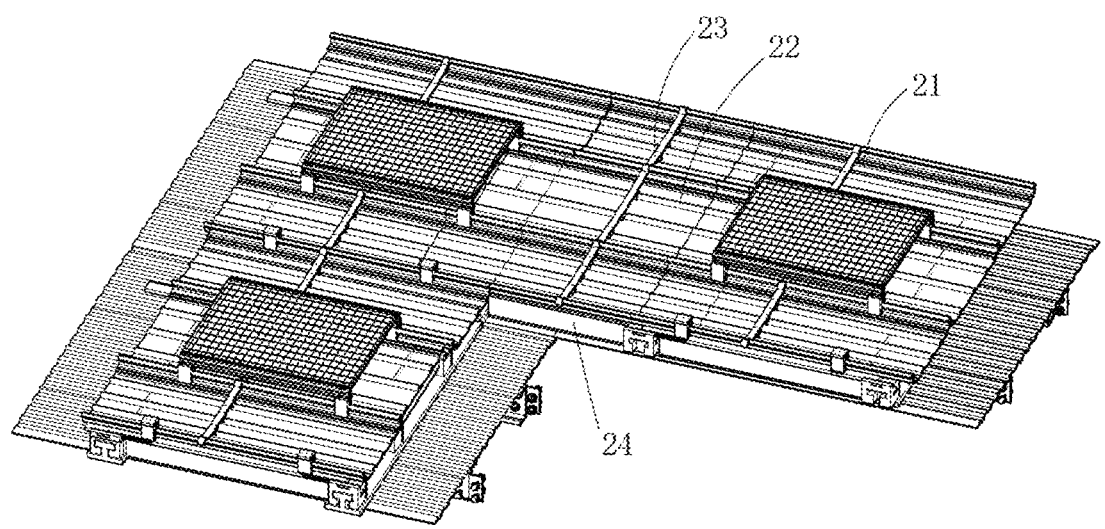
FIG. 4 is a partial structural view of FIG. 2 according to an embodiment of the present disclosure.

It is to be noted that two adjacent roof modules 21 are assembled in two ways. That is, two adjacent roof modules 21 along a roof span direction are assembled. On the other hand, two adjacent roof modules 21 along a direction perpendicular to the roof span direction are assembled (as shown in FIG. 4 and FIG. 5). The connecting plate 22 and the lower roof panel 212 are structurally the same, with two ends respectively provided with edges, and a middle folded.

When the two adjacent roof modules 21 along the roof span direction are assembled, two lower roof panels 212 are lapped up and down. That is, one lower roof panel 212 is lapped on the other lower roof panel 212, so as to resist water and divert the water. The waterproof strengthening component 24 is provided between two middle reinforcing components 213. Two upper roof panels 214 are connected through the connecting plate 22. In mounting, two ends of the connecting plate 22 are fittingly lapped on two adjacent upper roof panels 214, namely overlapped on the upper roof panels 214. The edges at the two ends of the connecting plate 22 are also overlapped up and down, and overlapped positions for the two ends of the connecting plate and the two ends of the upper roof panel (namely edges at two sides) are fixed by the self-locking component 218, thereby assembling the connecting plate 22 and the two roof modules 21. An overlapped position between the upper roof panel 214 and the connecting plate 22 are fixed thereon with the bridge reinforcing member 23. The bridge reinforcing member 23 is arc-shaped, with a middle bent, and two ends buckled to the upper roof panel 214 or the connecting plate 22. It provides a squeezing force for the upper roof panel 214 and the connecting plate 22 to achieve better wind uplift resistance. Before the connecting plate 22 is mounted, the waterproof strengthening component 24 is provided at the bottom of the connecting plate 22 and on the lower roof panel 212, so as to improve waterproofness between the two roof modules 21.

When the two adjacent roof modules 21 along the direction perpendicular to the roof span direction are assembled, two lower roof panels 212 are also lapped up and down (which is the same as the assembling way along the roof span direction). Two middle reinforcing components 213 are connected to ensure that reinforcing components 213 of the whole roof are connected into a whole at last. Two upper roof panels 214 are also overlapped up and down, with two overlapped positions each fixed by the self-locking component 218.

Figure 6:
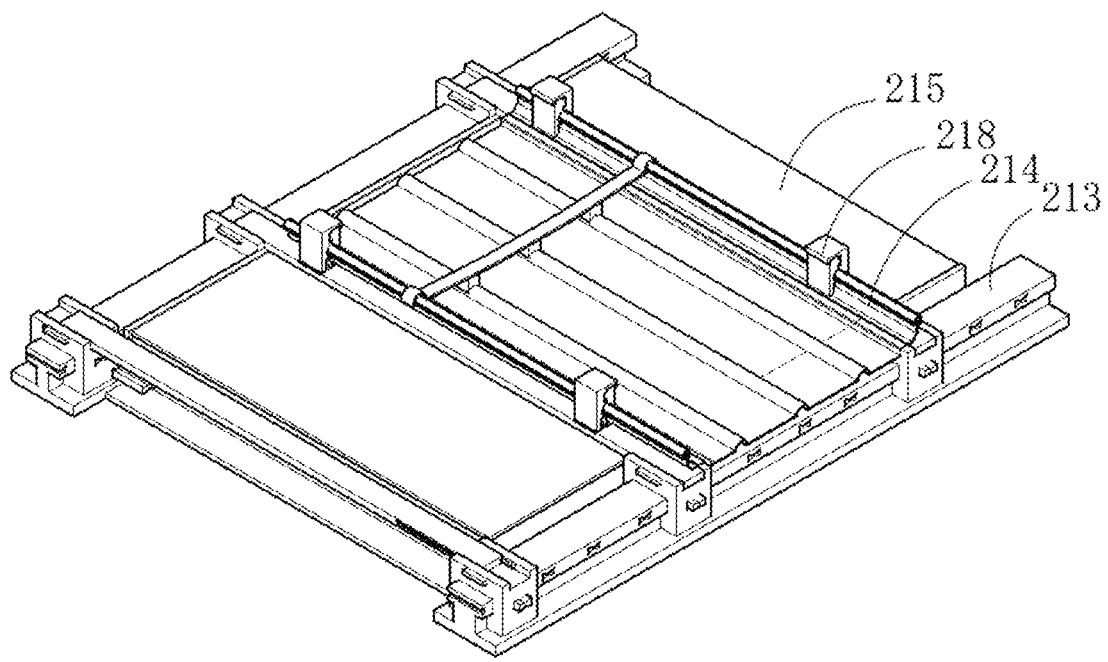
FIG. 6 is a partial structural view of FIG. 5 according to an embodiment of the present disclosure.
Figure 7:
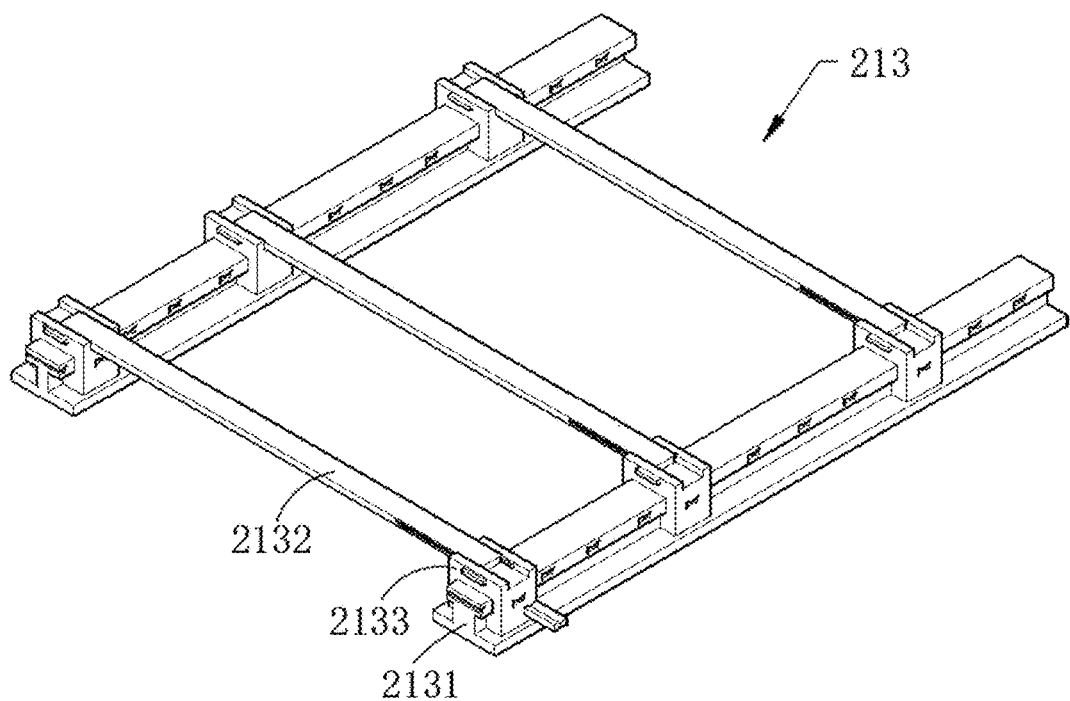
FIG. 7 is a structural view of a reinforcing component according to an embodiment of the present disclosure.

Referring to FIG. 6 and FIG. 7, the reinforcing component 213 includes two fastening beams 2131, sliding rods 2132, and sliders 2133. The fastening beams 2131, the sliding rods 2132, and the sliders 2133 are formed into a frame structure, and located at a middle position of the top of the lower roof panel 212. The two fastening beams 2131 are provided on the lower roof panel 212 in parallel. A plurality of sliders 2133 are provided on each fastening beam 2131. The slider 2133 can slide back and forth on the fastening beam 2131. The fastening beam 2131 may use a transverse H-shaped beam. The slider 2133 and the fastening beam 2131 may be limited up and down, and may be adjusted slidably as needed. There are also a plurality of sliding rods 2132. Two ends of each sliding rod 2132 are respectively detachably connected to sliders 2133 on the two fastening beams 2131. Upon completion of the mounting, the sliding rod 2132 is perpendicular to the fastening beam 2131, and the plurality of sliding rods 2132 are parallel to each other. It is to be noted that a specific number of the sliders 2133 on each fastening beam 2131 depends on the mounting situation of the site. Likewise, a specific number of the sliding rods 2132 also depends on the mounting situation of the site.

Further, referring to FIG. 6 and FIG. 7, a plurality of locating pin holes are equidistantly formed at two sides of the fastening beam 2131. Steel groove 21333 is formed in a bottom of the slider 2133. The steel groove 21333 is fittingly connected to the fastening beam 2131 in a sliding manner. Butterfly pin holes 21331 are further respectively formed at a left side and a right side of the slider 2133. The butterfly pin hole 21331 is a structure with two wide ends and a narrow middle. This structure achieves desirable stability. The butterfly pin hole 21331 is locked with the locating pin hole in the fastening beam 2131 by butterfly pin 21332. When a spacing between two adjacent sliding rods 2132 is to be adjusted in the assembly, a spacing between two sliders 2133 on the fastening beams 2131 can be adjusted. That is, the slider 2133 is slid on the fastening beam 2131. After adjusted to a desired position, the slider 2133 is locked with the fastening beam 2131 by the butterfly pin 21332.

It is to be noted that the fastening beam 2131 is a transverse H-shaped structure from a sectional view. Fastening grooves are respectively formed at two ends of the fastening beam 2131. The fastening groove is a half groove of the butterfly pin 21332. When two fastening beams 2131 are assembled, ends of the two fastening beams 2131 are extended into the sliders 2133, and the butterfly pin 21332 is inserted into the butterfly pin hole formed by the fastening grooves in the two fastening beams 2131, thereby fixing the two fastening beams 2131 (the fastening groove on the end of the fastening beam 2131 can be seen in FIG. 7), and realizing connection and fixation of the two adjacent fastening beams 2131. This structure can greatly improve stability between two adjacent fastening beams 2131, further realizes connection between adjacent roof panels, has high flexibility, strong practicability and simple mounting, and can greatly accelerate a construction speed.

Further, referring to FIG. 6 and FIG. 7, serrated runners 21321 are respectively provided on sidewalls at two ends of the sliding rod 2132. Groove 21336 is formed in a top of the slider 2133. The groove 21336 is fittingly connected to the sliding rod 2132 in a sliding manner. Serrated pin holes 21335 are respectively formed at a front side and a rear side of the slider 2133. The serrated pin hole 21335 and the serrated runner 21321 are locked by serrated pin 21334. In the assembly, when a spacing between two adjacent sliders 2133 is to be adjusted by the worker, a length of the sliding rod 2132 between the fastening beams 2131 can be adjusted. That is, the sliding rod 2132 is slid in the slider 2133. After adjusted to a desired position, the slider 2133 is locked with the sliding rod 2132 by the serrated pin 21334.

Figure 12:
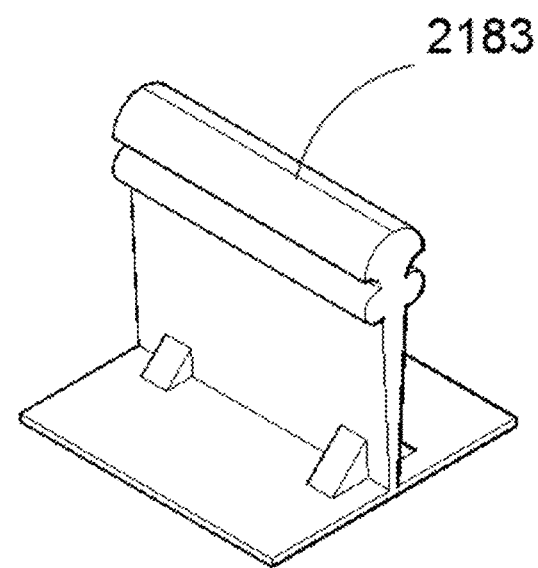
FIG. 12 is a structural view of a fixed support according to an embodiment of the present disclosure.
Figure 13:
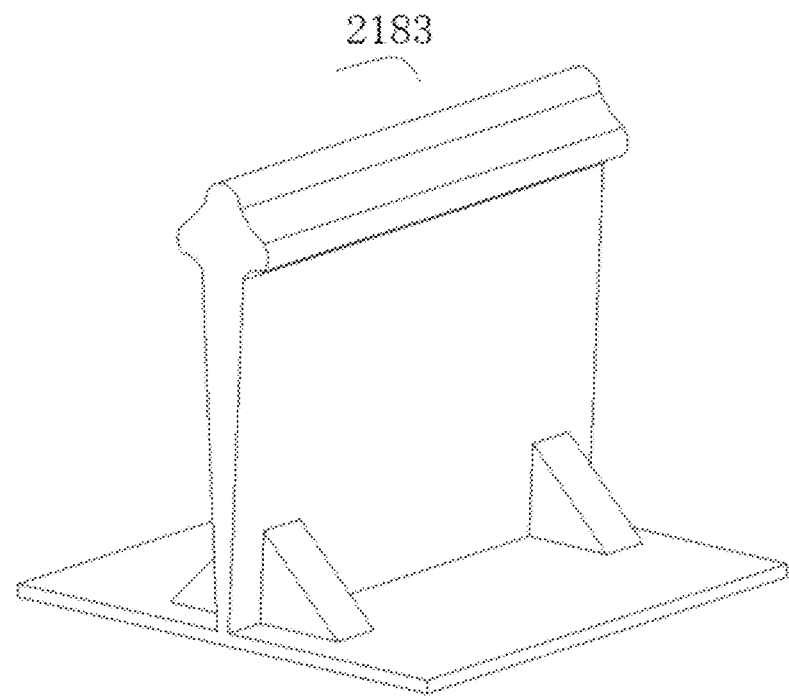
FIG. 13 is a structural view in another implementation of a fixed support according to an embodiment of the present disclosure.

Referring to FIGS. 9-13, the self-locking component 218 includes outer clamping member 2181 and inner clamping member 2182. The outer clamping member 2181 includes an inner clamping groove. The inner clamping member 2182 includes a clamping key matching with the inner clamping groove. The clamping key is inserted into the inner clamping groove to enclose a support clamping groove. A top protrusion of the outer clamping member 2181 wraps the inner clamping member from an upside of the inner clamping member 2182. This realizes dual clamping and self-locking. That is, with the outer clamping member 2181 and the inner clamping member 2182, the inner clamping groove and the clamping key are clamped internally, and the outer clamping member 2181 wraps the inner clamping member 2182 externally, thereby realizing dual self-locking of the self-locking component 218, and ensuring stability of the self-locking component 218. Clamping grooves are respectively formed inside the outer clamping member 2181 and inside the inner clamping member 2182. Fixed support 2183 is clamped into the support clamping groove formed by two clamping grooves. That is, a contour of the fixed support 2183 matches with the support clamping groove. Edges at two sides of the upper roof panel 214 are limited between the support clamping groove and the fixed support 2183. It is to be noted that the support clamping groove is composed of an upper portion and a lower portion. The upper portion is a fan-shaped groove, while the lower portion is a rectangular groove (as shown in FIG. 12 and FIG. 13).

Further, when the self-locking component 218 and the fixed support 2183 lock the upper roof panel 214 and the connecting plate 22, ends of the upper roof panel 214 and ends of the connecting plate 22 are around an outer side of the fixed support 2183. By this time, the fixed support 2183 supports the upper roof panel 214 and the connecting plate 22 internally. The outer clamping member 2181 and the inner clamping member 2182 fix the upper roof panel 214, the connecting plate 22 and the fixed support 2183 from two sides. That is, the outer clamping member 2181 and the inner clamping member 2182 fix the upper roof panel 214 and the connecting plate 22 externally. It is to be noted that two connecting plates 22 or an adjacent roof panel may further be stacked on the top of the upper roof panel 214, and then locked by the self-locking component 218. This case can be seen when two adjacent roof modules are assembled, and can be seen from FIG. 4.

Referring to FIG. 12, the fixed support 2183 includes a transverse locating plate and a vertical limiting rod perpendicular to the transverse locating plate. The vertical limiting rod is a gradually narrow structure from top to bottom. Inclined triangular brackets at two sides of a bottom of the vertical limiting rod are fixed to the transverse locating plate. A top of the vertical limiting rod is a curved protrusion. A recessed segment and a raised segment are provided sequentially downward along two sides of the curved protrusion. The multi-segment structure is integrally formed with the vertical limiting rod.

FIG. 13 illustrates another implementation of the fixed support 2183. This fixed support is also a gradually narrow structure from top to bottom, and is partially different at the top. This fixed support can also be used by the whole roof of the present disclosure.

Figure 8:
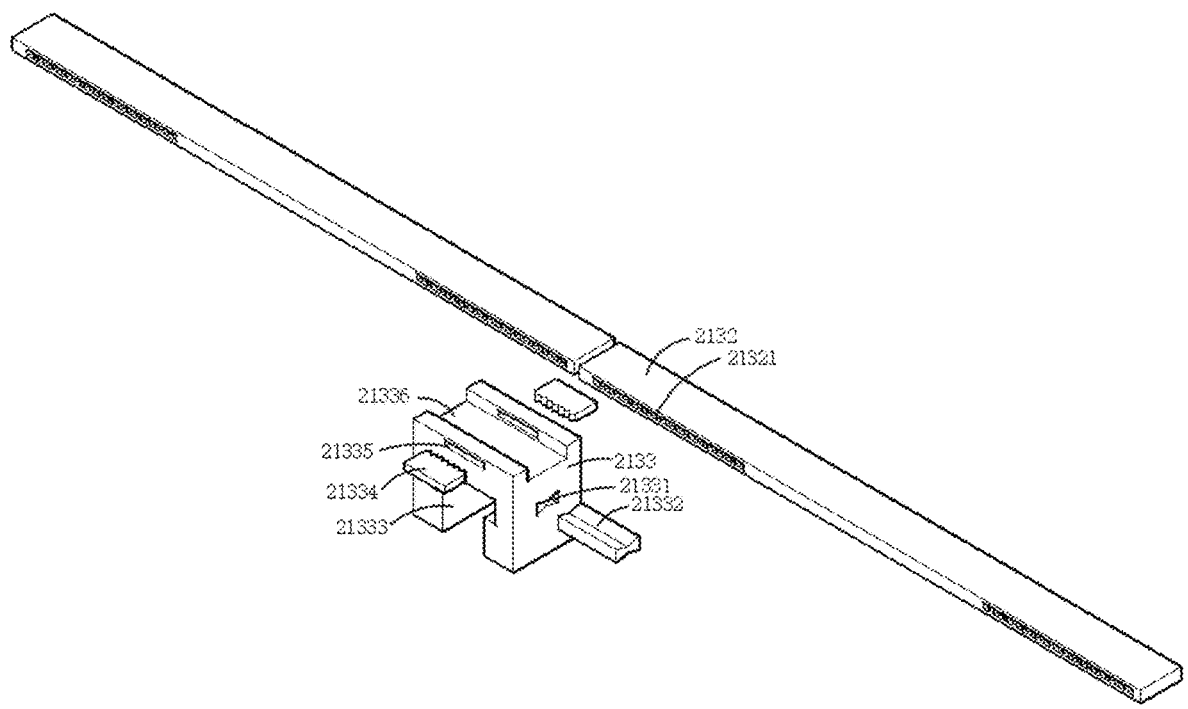
FIG. 8 is an exploded view between a slider and a sliding rod according to an embodiment of the present disclosure.
Figure 9:
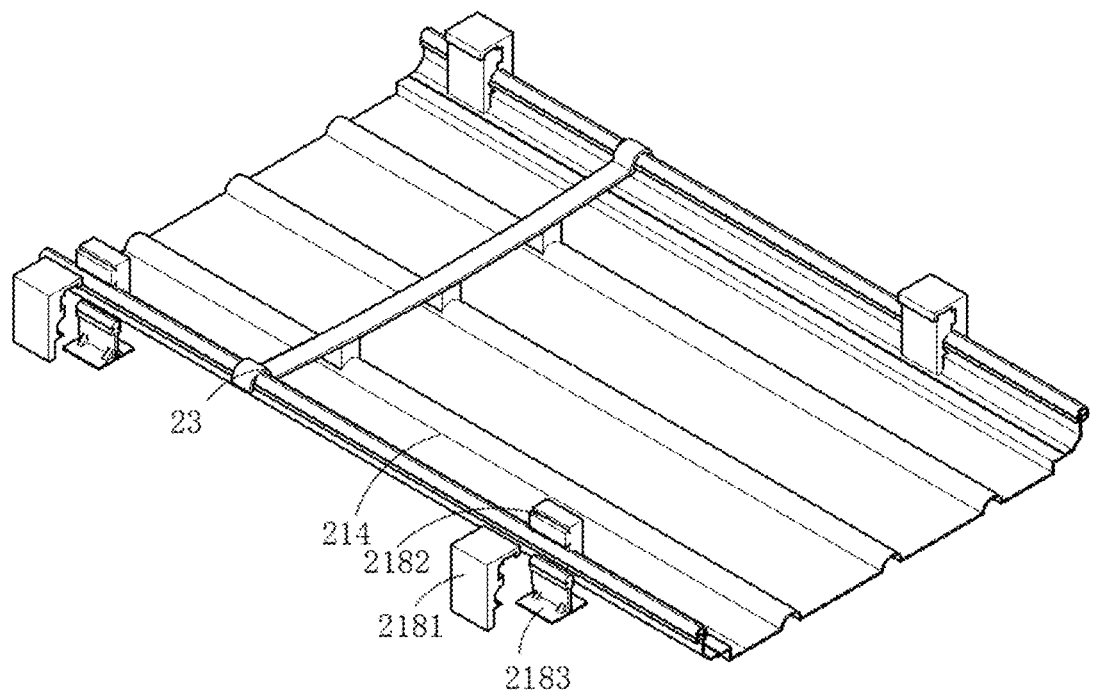
FIG. 9 is a partial exploded view of FIG. 6 according to an embodiment of the present disclosure.

As shown in FIG. 8, the edges at the sides of the upper roof panel 214 match with the vertical limiting rod in shape. The top of the upper roof panel is also a curved protrusion. A recessed segment and a raised segment are provided sequentially downward along two sides of the curved protrusion. The multi-segment structure is integrally formed with the upper roof panel 214.

Figure 10:
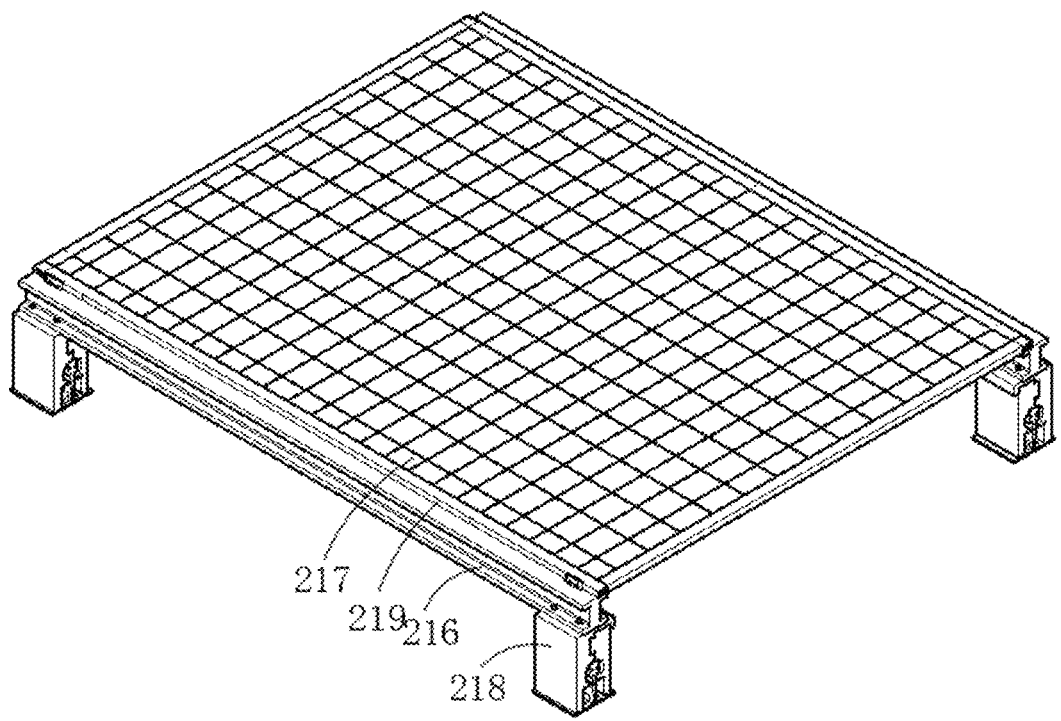
FIG. 10 is a structural view when a solar component cooperates with a self-locking component according to an embodiment of the present disclosure.
Figure 11:
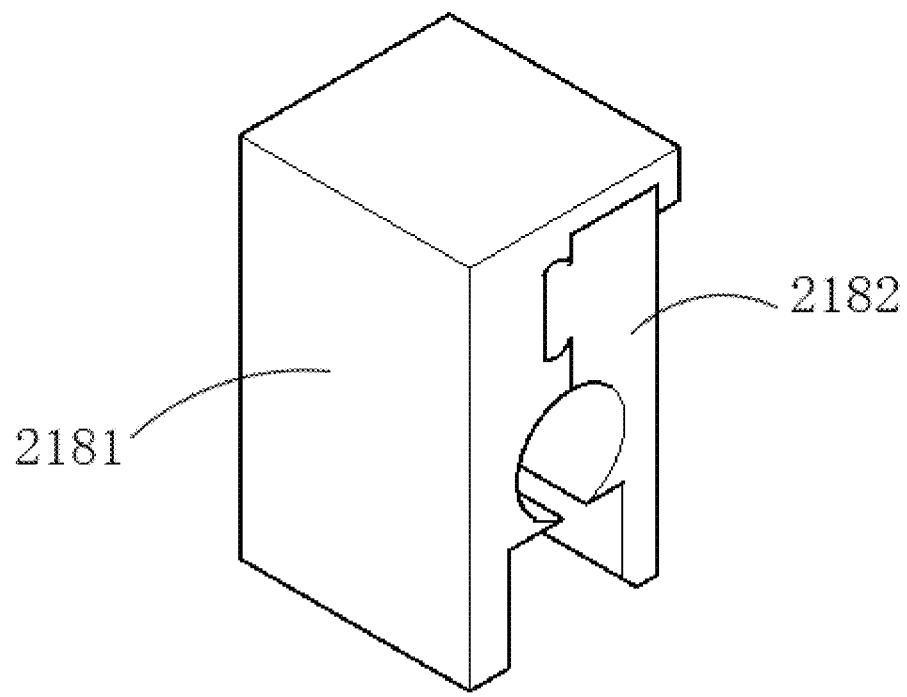
FIG. 11 is a structural view of a self-locking component according to an embodiment of the present disclosure.

Referring to FIG. 10, two sides of the solar panel 217 are respectively embedded into two nested plates 219. The two nested plates 219 are respectively detachably provided on two mounting stands 216. It is to be noted that an outer side of the nested plate 219 is further fixed to an opening of the mounting stand 216 through an L-shaped connecting plate with a bolt, thereby making the nested plate 219 more stable. With a photovoltaics, energy storage, direct current and flexibility (PEDF) technology, while national technical standards are met, the solar panel is fixed at the top of the self-locking component 218 with an embedding method to realize "energy storage" and "power supply", such that building electricity demands are not rigid, but flexible.

Figure 14:
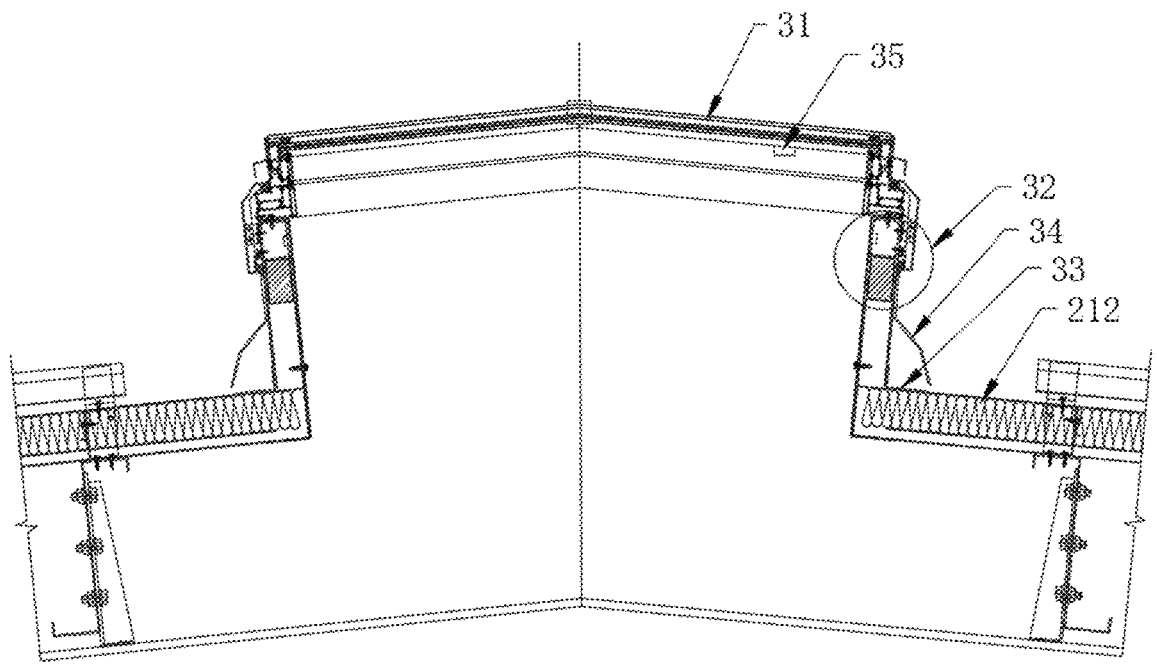
FIG. 14 is a structural view of a skylight at a ridge according to an embodiment of the present disclosure.
Figure 18:
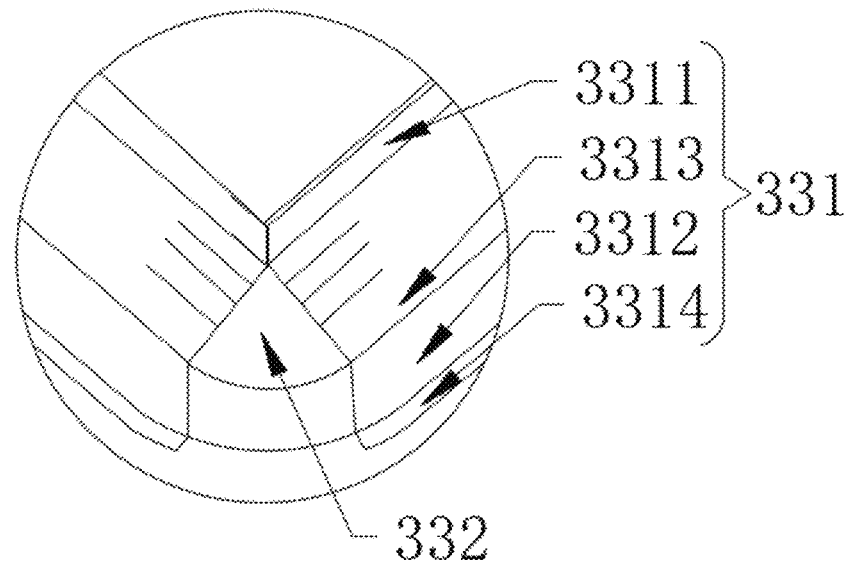
FIG. 18 is a schematic view when two adjacent folded plates are spliced with a corner splicing member according to an embodiment of the present disclosure.
Figure 19:
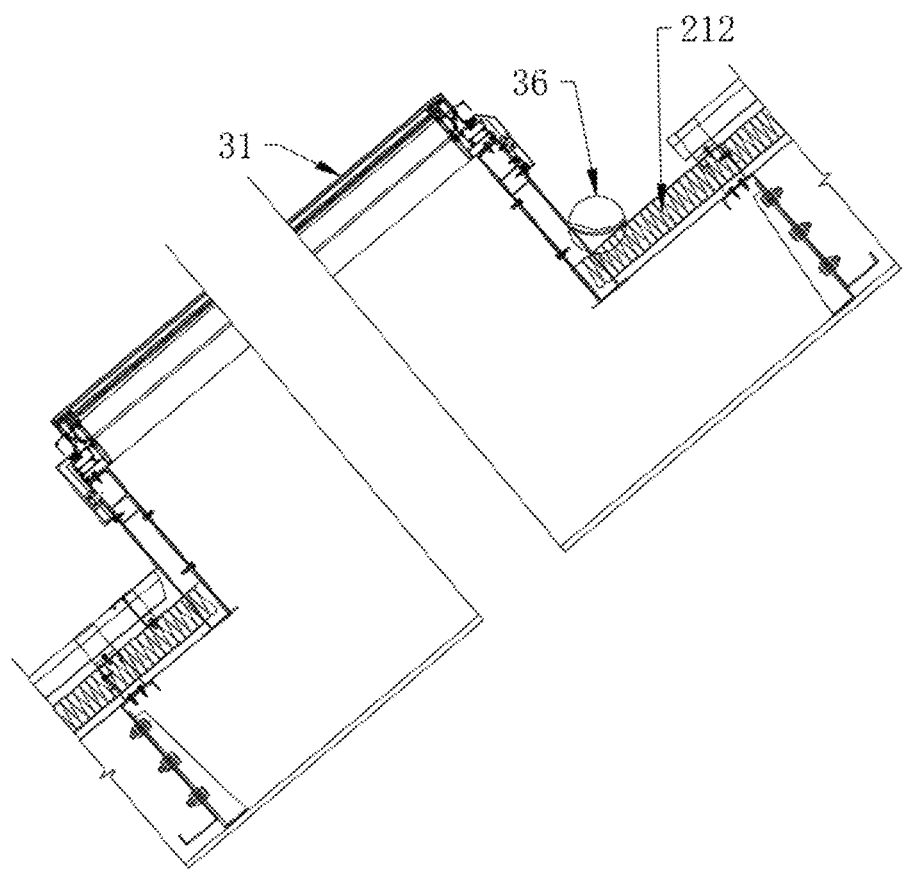
FIG. 19 is a structural view of a skylight at a pitched roof according to an embodiment of the present disclosure.
Figure 20:
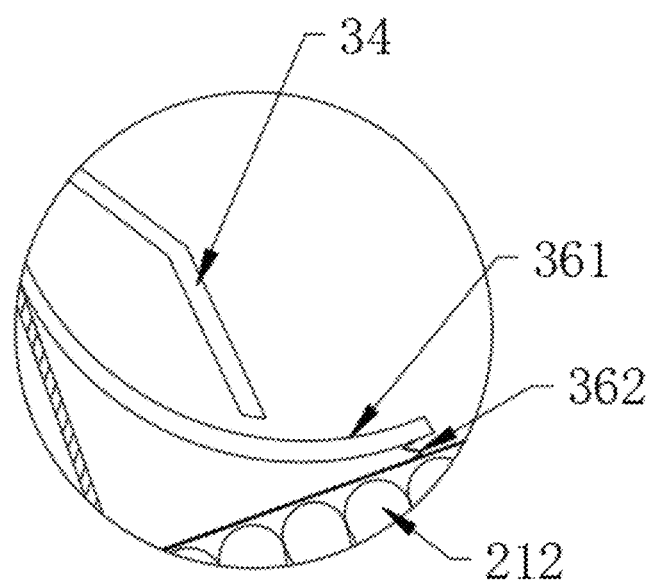
FIG. 20 is an enlarged view of a second anti-seepage component according to an embodiment of the present disclosure.
Figure 21:
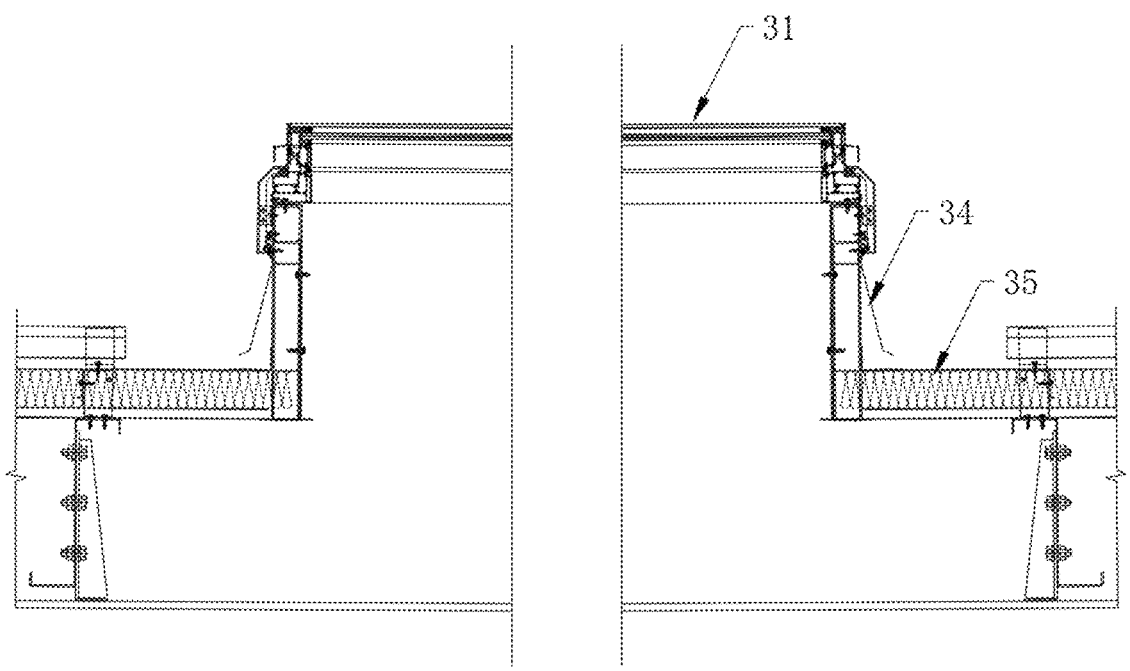
FIG. 21 is a structural view of a skylight at a flat roof according to an embodiment of the present disclosure.

Referring to FIG. 14, FIG. 19 and FIG. 21, the skylight is applied to the corrugated roof, and the corrugated roof has different heights in various regions. It is to be noted that a ridge of the corrugated roof has a greatest height, and suffers from a maximum negative wind pressure. Hence, four corners of the skylight 31 at the ridge each are provided with pressure relief adjustment component 32 in the present disclosure. Due to the maximum negative wind pressure at the ridge, the pressure relief adjustment component 32 is provided at the ridge, which is the most preferably embodiment (as shown in FIG. 14). The pressure relief adjustment component can balance the negative wind pressure on the skylight 31 at the ridge. In case of a linear change at the ridge, the pressure relief adjustment component 32 is more applied to the skylight at the ridge, and can balance the negative wind pressure on the skylight 31. The resulting negative wind pressure is released through the pressure relief adjustment component 32 when greater than a preset pressure of the pressure relief adjustment component 32. When the resulting negative wind pressure is less than the preset pressure of the pressure relief adjustment component 32, the skylight is damaged. In this case, a pressure relief device is ejected by an elastic member in the pressure relief adjustment component 32, and a pressure relief hole is opened to release the pressure, thereby ensuring a desirable bearing capacity of the skylight at the ridge. Certainly, the skylight 31 on the pitched roof of the corrugated roof and on the flat roof may also be provided with the pressure relief adjustment component 32 (as shown in FIG. 18 and FIG. 20). Whether the pressure relief adjustment component is provided specifically and a specific mounting position of the pressure relief adjustment component depend on the actual mounting situation.

Further, pressure sensor 35 is further provided inside the skylight 31. The pressure sensor 35 can monitor a wind pressure of the skylight 31 in real time.

Figure 15:
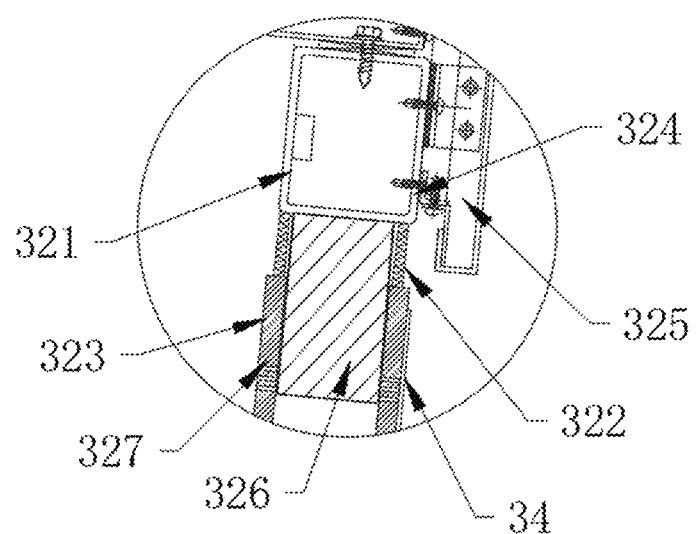
FIG. 15 is an enlarged view of a pressure relief adjustment component according to an embodiment of the present disclosure.

Referring to FIG. 14 and FIG. 15, the pressure relief adjustment device 32 includes square tube 321, elastic member 322, pressure relief hole 323, support plate 324, single plate 325, inner nested rod 326, and outer sleeve 327. A top of the inner nested rod 326 is connected to the square tube 321. A bottom of the outer sleeve 327 is fixed to the lower roof panel 212. A bottom of the inner nested rod 326 is connected in the outer sleeve 327 in a sliding manner. The pressure relief hole 323 is formed in the outer sleeve 327. A top of the outer sleeve 327 is connected to the square tube 321 through the elastic member 322. A top of the square tube 321 is fixed to the skylight 31. One end of the single plate 325 is connected to the square tube 321 through the support plate 324. The square tube 321 is provided at a side of the skylight 31. A gasket is further provided at a contact position between the inner nested rod 326 and the outer sleeve 327. The gasket is fixed on an inner wall of the outer sleeve 327. The gasket is located under the pressure relief hole 323. The gasket may use a sealing gasket, and is configured to prevent water from entering a gap between the inner nested rod 326 and the outer sleeve 327 to affect later use. When the inner nested rod 326 is slid upward in the outer sleeve 327, the pressure relief hole 323 is exposed to release the pressure. When the inner nested rod 326 is slid downward in the outer sleeve 327, the pressure relief hole 323 is obstructed to realize sealing.

When the external negative wind pressure acts on the skylight 31 at the ridge, the skylight 31 at the ridge is driven to move upward overall, thereby driving inner nested rods 326 at two sides of the skylight to slide upward in outer sleeves 327. When the pressure relief hole 323 in the inner nested rod 326 is exposed, the negative wind pressure of the skylight 31 can be released through the pressure relief hole 323. The outer sleeve 327 is connected to the square tube 321 through the elastic member 322. When the skylight 31 moves upward under the external negative wind pressure, the skylight 31 drives elastic members 322 at the two sides to extend. Upon completion of pressure relief, the skylight is restored under the elastic member 322. When the pressure sensor 37 detects that the negative wind pressure is greater than a preset pressure of the pressure relief device, the elastic member 322 works to drive the skylight 31 to move upward overall, and the pressure is released through the pressure relief hole. When the resulting negative wind pressure is less than a preset pressure of the pressure relief adjustment device 32, the skylight may be damaged. By this time, the elastic member 322 in the pressure relief adjustment device 32 is controlled manually to eject the pressure relief device, and the pressure relief hole is opened to release the pressure, thereby ensuring the desirable bearing capacity of the skylight at the ridge. It is to be noted that the elastic member 322 may use a common spring or a common shock absorber. A top of the single plate 325 is fixed to the skylight 31. The single plate 325 is fixed to the skylight 31 by a bolt or a pin roll or by welding.

Referring to FIG. 14, there are four flashings 34 that are respectively provided at four sides of the skylight 31. The flashing 34 includes a top fixed to the outer sleeve 326, and a bottom forming a gap with the lower roof panel 212. The flashing 34 can take a certain waterproof effect at a junction between the skylight 31 and the lower roof panel 212.

Meanwhile, a bottom of each of the four sides of the skylight 31 is fixed to the lower roof panel 212 through first anti-seepage component 33. The first anti-seepage component 33 can further ensure the waterproof effect at the junction between the skylight 31 and the lower roof panel 212.

Figure 16:
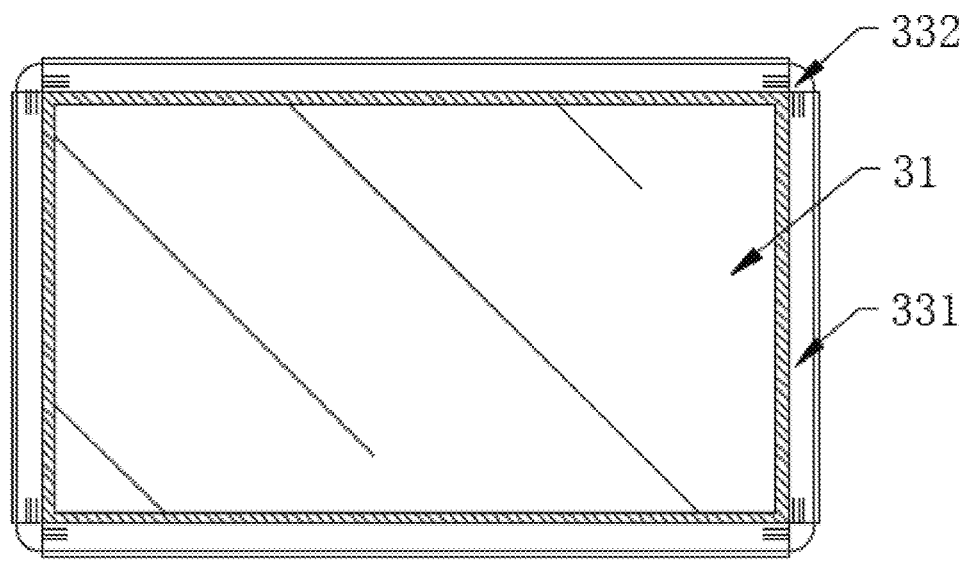
FIG. 16 is a top view when a skylight is connected to a first anti-seepage component according to an embodiment of the present disclosure.

Further, referring to FIG. 16, the first anti-seepage component 33 includes folded plate 331 and corner splicing member 332. The folded plate 331 is located at the bottom of the side of the skylight 31. The folded plate 331 includes one end welded to the skylight 31, and the other end welded to the lower roof panel 212. A corner splicing position between two adjacent folded plates 331 is fixed by the corner splicing member 332. The corner splicing member 332 is fittingly located at each of four corner positions of the skylight 31. That is, there are four corner splicing members 332 that are configured to connect folded plates 331 at the four sides of the skylight, thereby ensuring airtightness between the whole skylight 31 and the lower roof panel 212.

Figure 17:
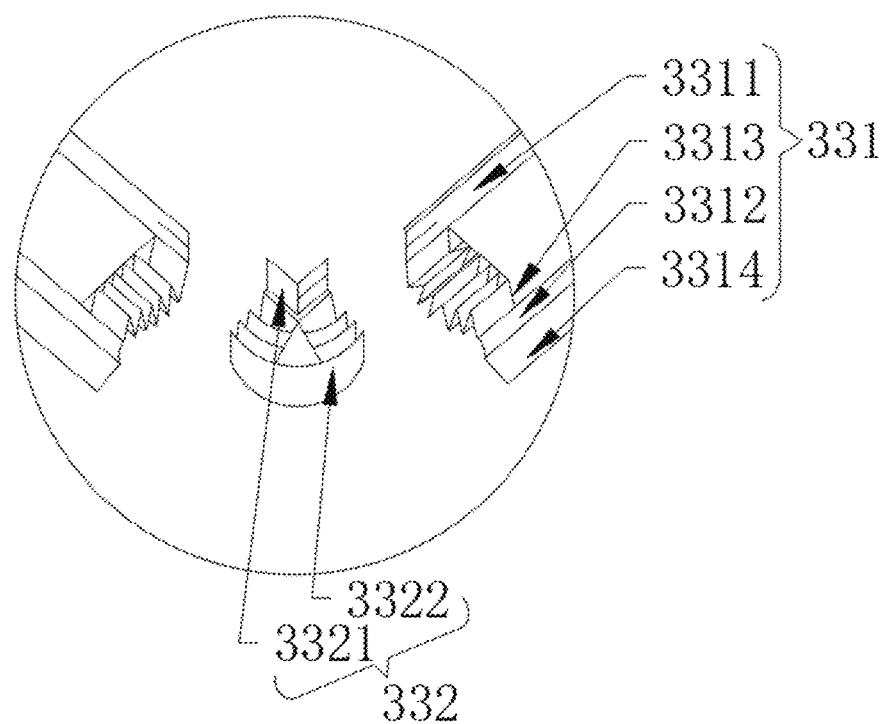
FIG. 17 is an exploded view of two adjacent folded plates and a corner splicing member according to an embodiment of the present disclosure.

Still further, referring to FIG. 17 and FIG. 18, the folded plate 331 includes skylight welding portion 3311, vertical lapping portion 3312, fold protruding portion 3313, and roof welding portion 3314 that are formed integrally. The skylight welding portion 3311 is fixed to the bottom of the side of the skylight 31. The roof welding portion 3314 is fixed to the lower roof panel 212. The fold protruding portion 3313 and the roof welding portion 3314 are respectively provided at two ends of the folded plate 331. The roof welding portion 3314 is configured to weld the roof. Fold protruding portions 3313 of two adjacent folded plates 331 are fixed by the corner splicing member 332, and may be fixed by a bolt or fixed by welding. Two adjacent vertical lapping portions 3312 are also be fixed by the corner splicing member 332. The vertical lapping portion 3312 is lapped on the corner splicing member 332. Both the vertical lapping portion and the vertical lapping portion may also be fixed by a bolt or fixed by welding. The corner splicing member 332 includes upper connecting portion 3321 and curved lapping portion 3322. The upper connecting portion 3321 is provided at a top of the curved lapping portion 3322. The upper connecting portion 3321 includes two welding edges perpendicular to each other. The two welding edges each are welded to a bottom of the corner of the skylight 31. The curved lapping portion 3322 is connected to two adjacent fold protruding portions 3313, and fixed to the fold protruding portions 3313 by welding. It is to be noted that the fold protruding portion 3313 is an uneven folded structure. Positions of the curved lapping portion 3322 connected to the fold protruding portions 3313 at two sides also use a corresponding uneven folded structure, and fittingly match with the fold protruding portions 3313 at the two sides. This increases the contact area between the curved lapping portion and the fold protruding portion, and ensures the stability and waterproof effect when the curved lapping portion and the fold protruding portion are welded. A bottom of the curved lapping portion 3322 is welded to the roof.

Referring to FIG. 19, the skylight 31 applied to the pitched roof (or the sloping roof) at the same time further includes second anti-seepage component 36 provided at a junction between the skylight 31 and an upslope of the pitched roof (as shown in FIG. 19). Since rainwater flows down along the pitched roof from a top of the ridge, and is concentrated to the junction between the skylight 31 and the upslope of the pitched roof, the second anti-seepage component 36 provided at the junction between the skylight 31 and the upslope of the pitched roof can prevent the rainwater flowing from the upslope to a downslope from affecting the airtightness between the skylight 31 and the roof panel to cause water leakage of the rooftop. In this way, the second anti-seepage component 36 can take a primary water retaining effect between the skylight 31 and the roof panel. The first anti-seepage component 33 between the skylight 31 and the roof panel can take a secondary water retaining effect, thereby further ensuring the airtightness between the skylight 31 and the roof panel.

Further, referring to FIG. 20, the second anti-seepage component 36 includes anti-seepage plate 361 and anti-seepage splicing plate 362. The anti-seepage plate 361 includes one end fixed to a side of the skylight 31 by welding or by a bolt, and the other end fixed to the lower roof panel 212 through the anti-seepage splicing plate 362. A top of the anti-seepage splicing plate 362 is welded to the anti-seepage plate 361. A bottom of the anti-seepage splicing plate 362 is welded to the lower roof panel 212. The anti-seepage plate 361 is a "C"-shaped structure. A curved opening of the "C"-shaped structure faces toward the upslope, which is not prone to water accumulation. The anti-seepage splicing plate 362 is an "S"-shaped structure, and may also be a "C"-shaped structure or other structures. A specific structure of the anti-seepage splicing plate depends on the actual situation of the site. FIG. 19 provides the "S"-shaped structure in the present disclosure, and the "S"-shaped structure is a most preferable implementation in the present disclosure. The S-shaped anti-seepage splicing plate is provided between the C-shaped anti-seepage plate and the roof. Compared with a right-angle connector, the junction of the S-shaped anti-seepage splicing plate is in smooth transition to reduce misalignment caused by stress concentration. Meanwhile, junctions of the S-shaped anti-seepage splicing plate and the C-shaped anti-seepage plate with the roof may also be connected by a rivet, specifically by a blind rivet, and obstructed by a sealant. This reduces a contact area between the C-shaped anti-seepage plate and the roof, and makes the connection firmer.

Figure 22:
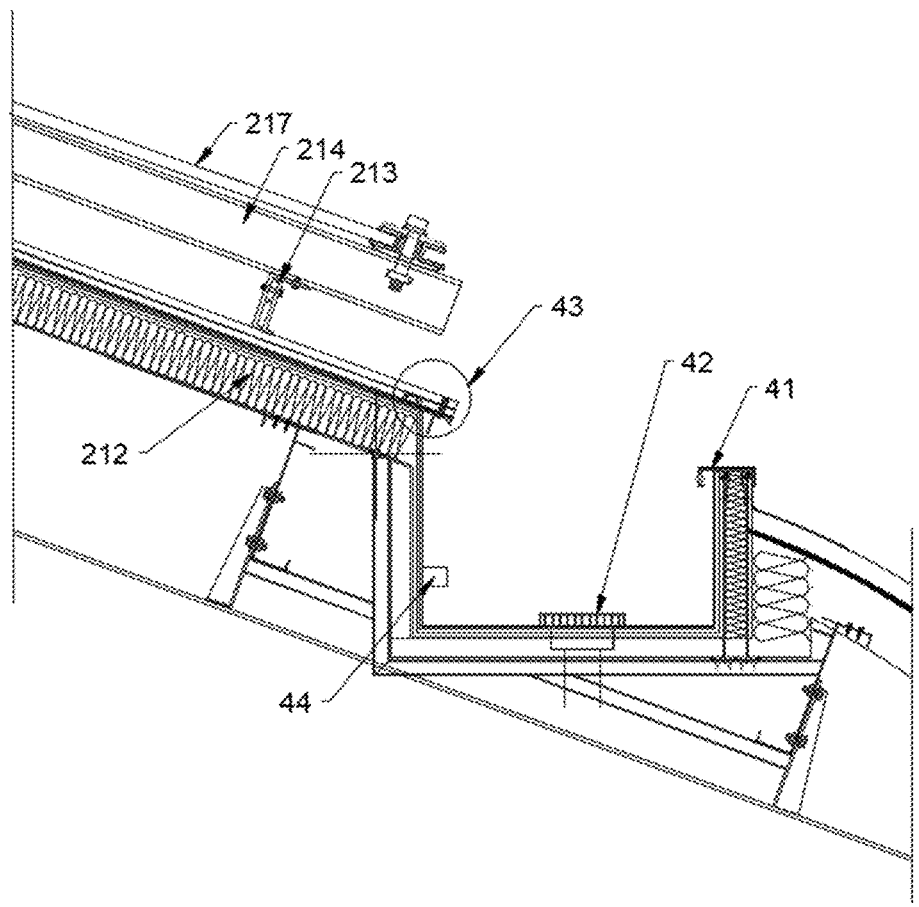
FIG. 22 is a structural view of a gutter system according to an embodiment of the present disclosure.

Referring to FIG. 22, when the gutter system 4 is applied to the flat roof, a plurality of gutters may be provided at an edge of the roof or at a middle of the roof according to an actual demand for drainage. When the gutter system 4 is applied to the corrugated roof, a gutter may be provided at the valley position according to an actual demand. With the gutter at the valley position, rainwater on the roof can be drained from the gutter 41, without affecting the roof.

The gutter 41 is specifically provided at a cornice of the lower roof panel 212. A rainwater inlet is formed in an inner bottom wall of the gutter 41. Siphonic roof drain 42 is provided at the rainwater inlet. A bottom of the inlet communicates with downspout 49. Downspout heat tape 46 is provided in the downspout 49, and connected to junction box 48 on an inner wall of the gutter. Cornice snow melting component 43 is provided at an upper cornice of the gutter 41, so as to realize snow melting at the cornice of the roof, and prevent an ice piton at the cornice from falling into the gutter 41 to damage the gutter. Water pressure monitor 44 is provided on a sidewall of the gutter 41, and configured to detect a pressure of water in the gutter 41. A gutter snow melting component is provided inside the gutter 41. The gutter snow melting component can realize snow melting in the gutter.

Figure 27:
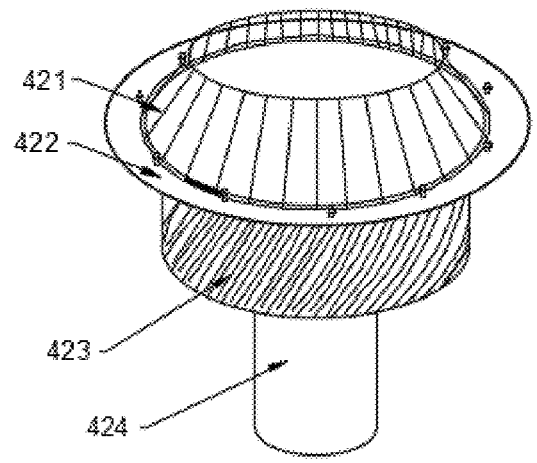
FIG. 27 is a structural view of a siphonic roof drain according to an embodiment of the present disclosure.
Figure 28:
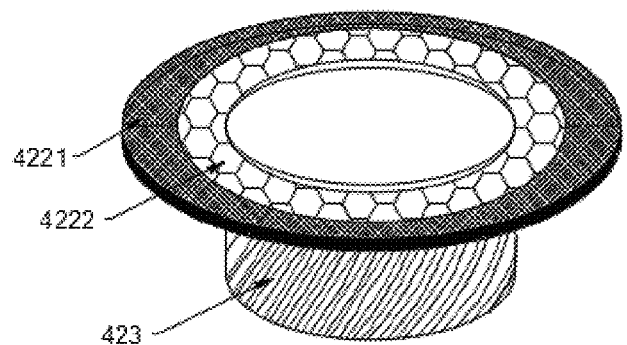
FIG. 28 is a structural view of a gasket according to an embodiment of the present disclosure.

Referring to FIG. 27 and FIG. 28, the siphonic roof drain 42 includes conical drainage portion 421, gasket 422, oblique spiral portion 423, and water outlet 424. A top of the oblique spiral portion 423 is provided with the conical drainage portion 421. The gasket 422 is located outside the oblique spiral portion 423. The oblique spiral portion 423 communicates with the bottom water outlet 424. During mounting, the oblique spiral portion 423 is connected to an inlet tube. The gasket 422 is tightly attached to the inlet, so as to ensure airtightness between the oblique spiral portion 423 and the inlet tube. The water outlet 424 is connected to the downspout 49. During use, rainwater flows to the oblique spiral portion 423 from the conical drainage portion 421, and is drained from the water outlet 424 to the downspout 49. The downspout heat tape 46 can heat the downspout 49, so as to prevent the downspout 49 from icing for a low temperature to cause blockage. It is to be noted that a screw thread is provided outside the oblique spiral portion 423. This not only ensures the stability in the mounting, but also prevents a temperature effect at a drain gully due to heat generated by the downspout heat tape 46 in the downspout 49, and enhances a heat dissipation effect of the siphonic roof drain 42.

Further, the gasket 422 further includes expandable layer 4221 and honeycomb waterproof layer 4222. The expandable layer 4221 and the honeycomb waterproof layer 4222 are formed integrally to form the integrated gasket. The expandable layer 4221 is located outside the honeycomb waterproof layer 4222. The expandable layer 4221 serves as an outermost layer of the gasket 422 and functions to enhance heat dissipation. A heat dissipation effect becomes stronger as a thickness of the expandable layer increases. The honeycomb waterproof layer serves as an inner layer. A honeycomb layer is provided at a junction between the honeycomb waterproof layer and the expandable layer. The honeycomb layer can prevent exacerbation of a damage, and can ensure a service life of the gasket. It is to be noted that the expandable layer is preferably made of a mixture of expanded graphite, a polyvinyl chloride (PVC) plasticizer, a PVC thermostabilizer and a filler.

The integrated gasket of the siphonic roof drain is further described as follows:

Comparative Embodiment 1: The integrated gasket of the siphonic roof drain has a total diameter of 100 mm, and the honeycomb layer has a diameter of about 30 mm.

Embodiment 2: The integrated gasket of the siphonic roof drain has a total diameter of 100 mm, the outermost expandable layer has a diameter of about 10 mm, and the honeycomb layer has a diameter of about 20 mm.

Embodiment 3: Likewise, the integrated gasket of the siphonic roof drain has a total diameter of 100 mm, the honeycomb layer has a diameter of 18 mm, and the outermost expandable layer has a diameter of 12 mm.

Embodiment 4: Likewise, the integrated gasket of the siphonic roof drain has a total diameter of 100 mm, the honeycomb layer has a diameter of 16 mm, and the outermost expandable layer has a diameter of 14 mm.

Embodiment 5: Likewise, the integrated gasket of the siphonic roof drain has a total diameter of 100 mm, the honeycomb layer has a diameter of 14 mm, and the outermost expandable layer has a diameter of 16 mm.

Embodiment 6: Likewise, the integrated gasket of the siphonic roof drain has a total diameter of 100 mm, the honeycomb layer has a diameter of 12 mm, and the outermost expandable layer has a diameter of 18 mm.

Heat dissipation test: Table 1 shows test results of the integrated gasket in Embodiments 1-5.

| | Comparative Embodiment 1 | Embodiment 2 | Embodiment 3 | Embodiment 4 | Embodiment 5 | Embodiment 6 |
|---|---|---|---|---|---|---|
| Temperature Change/° C. | +11 | +4 | +2.8 | +1.7 | +1.0 | +0.7 |

As can be seen from Table 1, the temperature change on the surface of the gasket in Embodiments 2-5 is less than 5° C. The Comparative Embodiment 1 in which the expandable layer is not provided has a temperature rise of higher than 10° C. This indicates that the novel gasket has a desirable heat dissipation capability, and as an area of the expandable layer increases, the heat dissipation capability is better.

Figure 23:
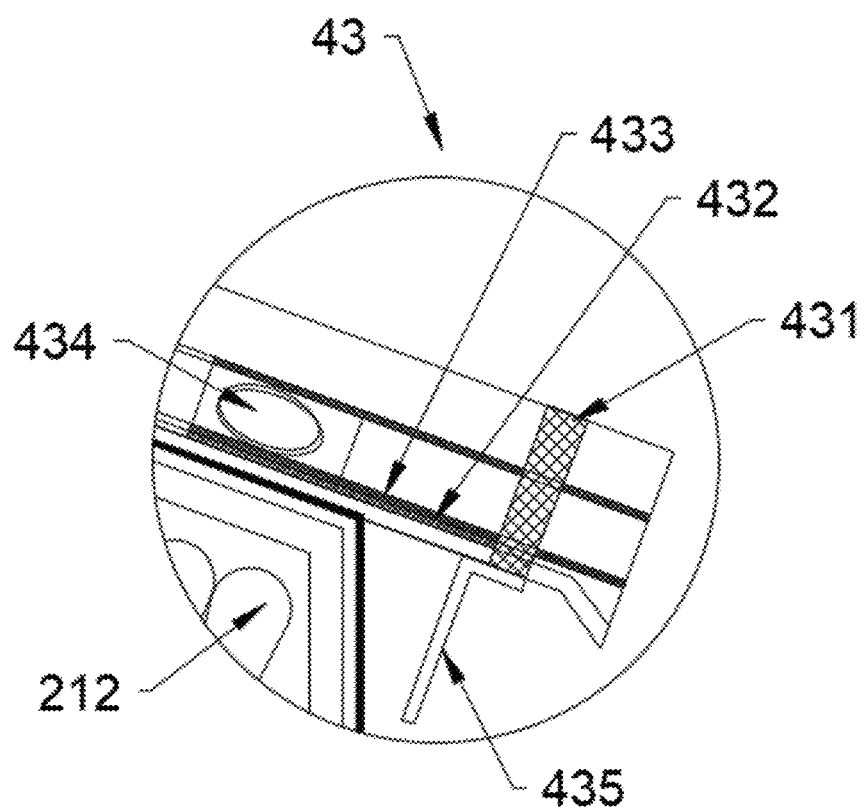
FIG. 23 is an enlarged view of a cornice snow melting component according to an embodiment of the present disclosure.

Referring to FIG. 22 and FIG. 23, the cornice snow melting component 43 is provided at a top of the roof and the upper cornice of the gutter 41. The cornice snow melting component 43 includes cornice cap 431, insulating layer 432, thermal conductive gasket 433, heating cable 434, and second flashing 435. The cornice cap 431 is located on an end of the roof. The thermal conductive gasket 433 and the insulating layer 432 are sequentially provided on the end of the roof. The heating cable 434 is located on the thermal conductive gasket 433. The heating cable 434 is connected to the solar panel 217 on the roof. The second flashing 435 is provided under the cornice cap 431. There is a gap between the second flashing 435 and the lower roof panel 212. A waterflow can flow out from the second flashing 435 through the cornice cap 431, without seeping into the roof to affect the roof.

It is to be noted that the heating cable 434 at the upper cornice of the gutter is the heat tape, and realizes snow melting at the upper cornice of the gutter in a snowy weather. As a consequence, the snow is not iced easily to form the "ice piton" to obstruct the upper cornice of the gutter and cause the problem that the roof cannot drain water timely in the snowy weather. Meanwhile, the heating cable can further prevent the melting "ice piton" from suddenly falling off to damage the gutter. The heating cable 434 is connected to the solar panel 217 on the rooftop. The thermal conductive gasket 433 is provided on the heating cable 434. The thermal conductive gasket 433 is also provided from a lower contact position of the heating cable 434 to the cornice, so as to increase heat and an area of the heating cable 434. The insulating layer 432 is provided from the cornice cap under the thermal conductive gasket 433 to the heating cable, so as to prevent heat transferred by the thermal conductive gasket 433 from causing a temperature effect to affect a lower structure. Meanwhile, the cornice cap 431 can prevent a water drop from seeping into the roof. The solar panel 217 can provide energy for the heating cable 334 in the cornice snow melting component 43 and the water pressure monitor 34.

Figure 24:
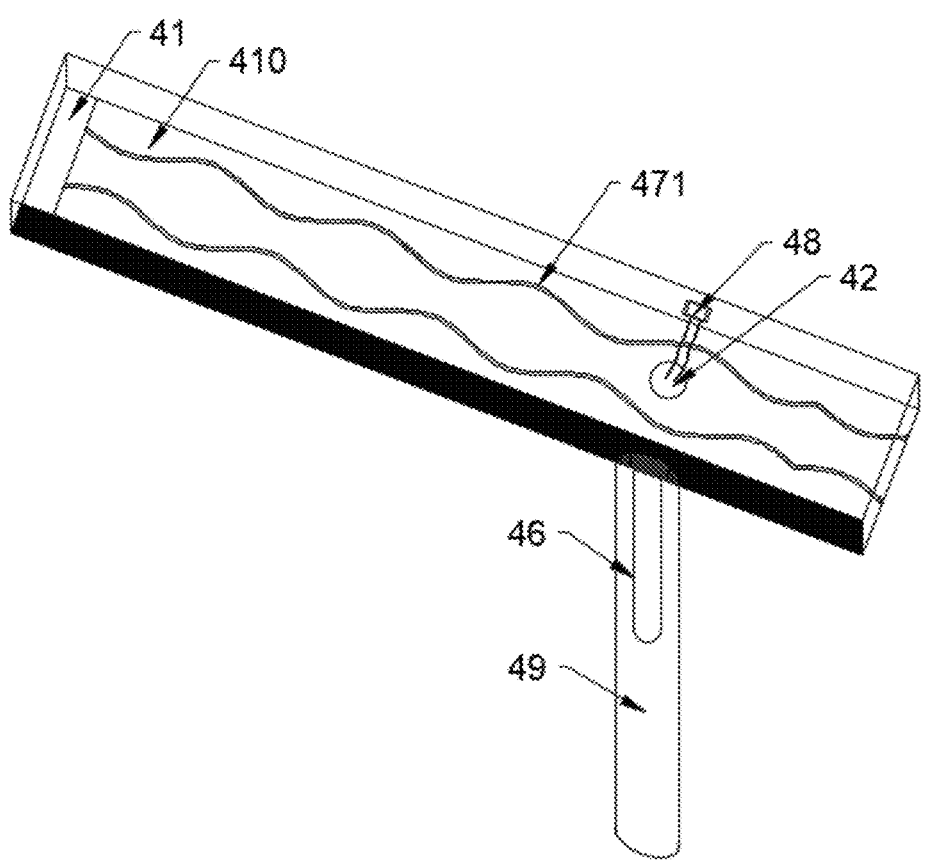
FIG. 24 is a structural view when a gutter cooperates with a downspout according to an embodiment of the present disclosure.
Figure 25:
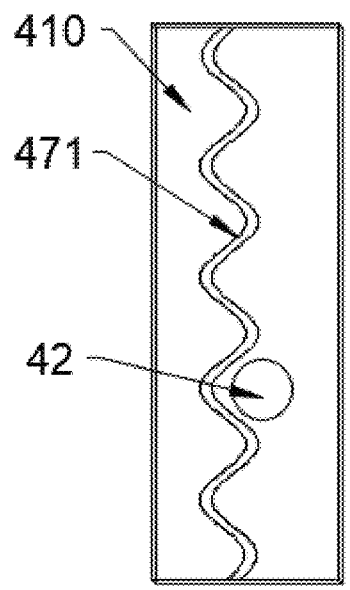
FIG. 25 is a structural view when one heat tape is provided in a gutter according to an embodiment of the present disclosure.

Referring to FIG. 24, the gutter snow melting component includes gutter heat tape 471 and a groove formed in the thermal conductive plate 410. The groove is a "snakelike" structure. The gutter heat tape 471 is provided in the groove in a snakelike manner. The gutter heat tape 471 is connected to the solar panel 217 on the roof. This method is to provide the heat tape in the gutter to melt the snow.

It is to be noted that since the "snakelike" groove is formed in the thermal conductive plate, and the gutter heat tape 471 is provided in the groove, the gutter heat tape 471 is also a "snakelike" structure. This can increase a coverage area of the heat tape in the gutter 41, and solve problems of small area coverage, energy saving and the like for the heat generated by the heat tape on the surface of the gutter 41. The thermal conductive plate may be preferably made of a material with desirable thermal conductivity, such as metal and ceramic. The present disclosure can use the fewer heat tape to uniformly generate a large area of heat to cover the whole gutter 41, and melt the snow timely in the snowy weather. In case of a small area of the gutter 41, an area proportion of the "snakelike" thermal conductive plate can be reduced appropriately, and one "snakelike" groove is formed in the gutter (FIG. 24 illustrates that one groove is formed in the gutter and one heat tape is provided, while FIG. 23 illustrates that two grooves are formed in the gutter and two heat tapes are provided). A specific number of the grooves and a specific number of the heat tapes depend on an actual size of the gutter and a field need, and are not defined in the present disclosure. Although only two implementations are given, the present disclosure is intended to generate a large area of heat on the surface of the gutter with the fewer heat tape to save the energy and melt the snow timely.

Figure 26:
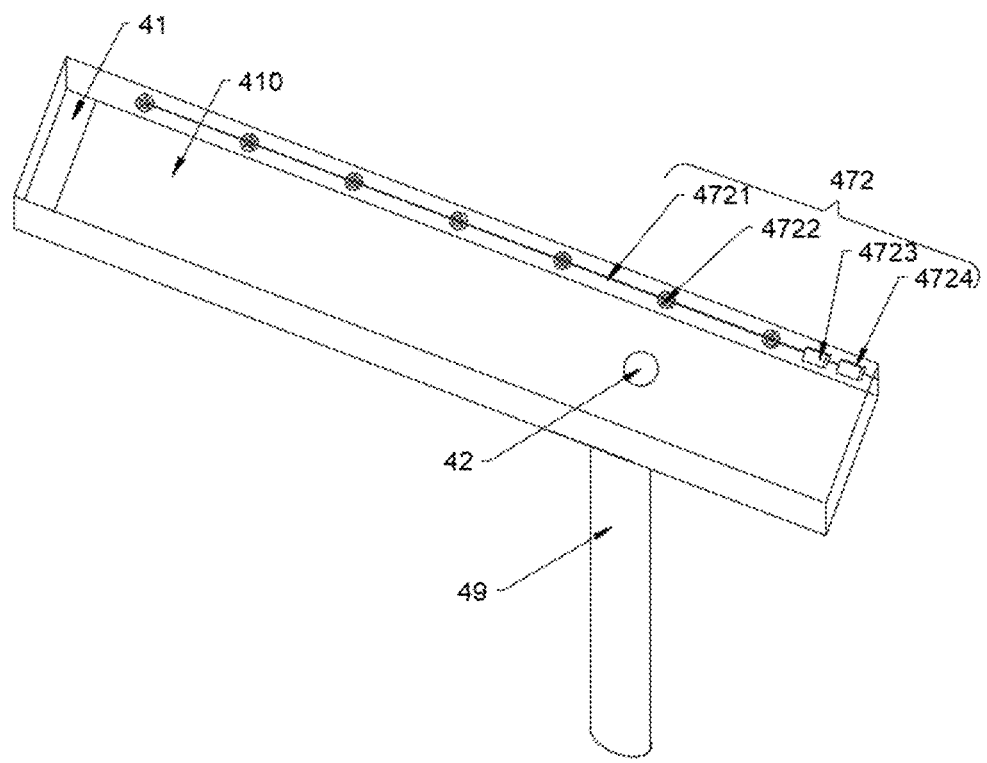
FIG. 26 is a structural view when a gutter cooperates with an intelligent spraying member according to an embodiment of the present disclosure.

Referring to FIG. 26, in another implementation, the gutter snow melting component includes intelligent spraying member 472. The intelligent spraying member 472 includes tube 4721, a plurality of high-pressure nozzles 4722, automatic spraying control module 4723, and snowfall sensor 4724. The plurality of high-pressure nozzles 4722 are equidistantly arranged on the sidewall of the gutter 41. The plurality of high-pressure nozzles 4722 communicate with each other through the tube 4721. It is to be noted that a specific number of the high-pressure nozzles 4722 depends on a size of the gutter and an actual mounting situation, and is not defined herein in the present disclosure. The automatic spraying control module 4723 and the snowfall sensor 4724 are provided on an end of the sidewall of the gutter 41. One end of the tube 4721 communicates with a snow-removing agent box. A snow-removing agent is saline water or a snow melting agent. The snow-removing agent in the snow-removing agent box can be automatically conveyed to the tube 4721 under control of the automatic spraying control module 4723, and then sprayed to the gutter by the high-pressure nozzle 4722, thereby realizing the snow melting in the gutter. This method is to spray the saline water or the snow melting agent to the gutter to realize the snow melting. It is to be noted that the intelligent spraying solution serves as a reinforcement on the basis of the thermal conductive plate 410. The gutter heat tape 471 can dissipate a large amount of heat through the thermal conductive plate 410, thereby melting the snow. The intelligently sprayed saline water and snow melting agent is also intended to melt the snow, thereby enhancing the snow melting effect in the gutter.

It is to be noted that the intelligent spraying member 472 can remove the snow in the gutter in winter, and cool the gutter in summer. The tube 4721 is provided on inner walls at two sides of the gutter and at 0.1-0.3 mm above the bottom of the gutter. A specific mounting height of the tube depends on a mounting situation of the site or an actual size of the gutter. The present disclosure does not define the height, but only gives a preferable range for reference. In the present disclosure, the tube 4721 is connected to the snowfall sensor 4724 and the automatic spraying control module 4723 at the same time. The snowfall sensor 4724 can sense an amount of snow and a temperature. In case of a snowfall in winter, when the temperature is less than 0° C., the snowfall sensor 4724 controls the automatic spraying control module to spray the snow-removing agent upon receipt of a signal, and can further control a water spraying amount according to the amount of snow. Particularly in case of a sudden snowfall at midnight, the system works immediately to prevent the snow from icing in the gutter. In case of a hot weather in summer, the automatic spraying system 4723 can be controlled within a certain temperature range to spray clear water for cooling, thereby protecting the components, prolonging the service life. While melting the snow in the gutter, the device does not make the metal roof generate a temperature difference, and can effectively prevent water leakage and a loose phenomenon of the metal roof at the junction for the temperature effect.

A roof box is provided in the roof. The roof box internally includes an inverter, an energy storage module, a load, a water pressure signal transfer module, and a heating control module that are sequentially connected from top to bottom. The inverter is connected to the solar panel 217. The inverter is configured to convert a direct current (DC) generated by the solar panel 217 into an alternating current (AC). The energy storage module is configured to store electric energy converted by the inverter and transport the electric energy to the electricity load. The heating control module is configured to control a working state, heating time and an adjusted temperature of the heat tape at each position. The water pressure signal transfer module is connected to the water pressure monitor 44. The water pressure signal transfer module is configured to transfer a water pressure in the gutter detected by the water pressure monitor 44. When it is detected that the water pressure in the gutter is abnormal, inspection and maintenance are conducted timely.

A specific mounting principle of the roof body in the present disclosure is as follows:

Before assembly, (1) an assembly platform is constructed on the ground along a span direction of a plant before the metal roof is assembled. The assembly platform is as high as the roof pillar 1, with a bearing capacity as needed. A sliding track for temporary assembly is provided on the roof pillar of the plant. (2) The steel structural plant is divided into different regions, and assembled by the different regions. For the steel structural plant with a large structural span, a plurality of roofs are fixed through the assembly platform, and then slid overall for mounting. (3) A bolt hole is formed in the roof pillar, so as to slide the roof module to a specified position for bolting.

It is to be noted that the bottom of the assembly platform is supported by some support posts. The top of the platform may be slightly lower than the roof pillar. In response to mounting, components and parts are transported to the platform, and assembled directly on the assembly platform, so as to erect the whole module on the roof pillar. Since the assembly platform is not the solution protected by the present disclosure, and the assembly platform is relatively common in the construction site at present, the assembly platform is briefly described herein.

In the present disclosure, the single roof module is assembled as follows:

In assembly, prefabricated members for the roof modules 21 of the plant are transported to the site, and the single roof module 21 is assembled on the assembly platform. The lower roof panel 212 is provided on the support beam 211. Sliding shoes are provided at a bottom of the support beam 211. The sliding shoes are slidable on the sliding track. The fastening beam 2131, the slider 2133 and the sliding rod 2132 are sequentially provided on the lower roof panel 212, and locked. The self-locking component 218 is provided on the sliding rod 2132. The upper roof panel 214 is fixed by the self-locking component 218. The heat-preserving vapor barrier layer 215 is provided at a gap between the fastening beam 2131 and the sliding rod 2132. The heat-preserving vapor barrier layer 215 sequentially includes the vapor barrier layer, the heat preservation layer, and the waterproof layer from bottom to top. The solar panel 217 is provided on the self-locking component 218. The assembled single roof module 21 is slid to a specified position of the roof through the sliding track on the roof pillar. The roof module is lifted by a jack. The jack is used to lift the support beam 211, and then slowly place the whole module on the roof pillar. The whole module is fixed. The sliding shoes are removed. The corresponding segment of the sliding track is removed. The roof module 21 is fixedly connected to the roof pillar 1. It is to be noted that in case of a large span between roof pillars, a temporary steel pillar may be provided at a middle between the roof pillars in the span direction. The temporary steel pillar has a same height as the left and right roof pillars. The sliding track is also provided on the temporary pillar, and slid in same steps. When the roof modules at two sides are slid to specified positions at the same time, bottom support beams 11 at the two sides are connected by a bolt. A part of the sliding track is removed with the jack.

The waterproof strengthening component 24 is provided at a junction between two adjacent roof modules 21. The two adjacent roof modules 21 are connected by the connecting plate 22 on the waterproof strengthening component 24. In assembly, attentions are paid to a size arrangement, as well as misalignment between front and rear roof panels. In case of a large span of the plant, a plurality of modules are mounted and then slid overall. Meanwhile, a load stability test is conducted on the assembly platform. In case of the large span of the plant, the temporary pillar is used for assistance, and the steps refer to the above description on the temporary pillar. The above steps are performed sequentially. The whole roof is assembled separately, and slid to a specified position. The roof is adjusted finely through a fine adjustment system between the fastening beam 2131, the sliding rod 2132 and the slider 2133 of the roof system, thereby achieving the overall roof effect.

When the roof body 2 is assembled, the skylight system 3 and the gutter system 4 are provided as needed, with a specific mounting position and a specific mounting number depending on the situation of the site as well as the size, shape and the like of the roof body 2.

When the skylight system 3 is used, and an external negative wind pressure acts on the roof in cloudy and rainy weathers, different wind pressures are generated at different positions of the roof, and the negative wind pressure at the ridge is maximum. The skylight 31 at the ridge also suffers from the maximum negative wind pressure correspondingly, such that the skylight 31 moves upward. In case of the large negative wind pressure, the skylight 31 may be damaged. The following is the negative wind pressure at the slope. The negative wind pressure at the slope is not as large as the negative wind pressure at the ridge, but poses a threat. Hence, the skylight 31 at each of the flat roof, the sloping roof and the ridge is provided with the pressure relief device.

When the external negative wind pressure acts on the skylight 31 at the ridge, the skylight 31 at the ridge is driven to move upward overall, thereby driving inner nested rods 326 at two sides of the skylight to slide upward in outer sleeves 327. When the pressure relief hole 323 in the inner nested rod 326 is exposed, the negative wind pressure of the skylight 31 can be released through the pressure relief hole 323. The outer sleeve 327 is connected to the square tube 321 through the elastic member 322. When the skylight 31 moves upward under the external negative wind pressure, the skylight 31 drives elastic members 322 at the two sides to extend. Upon completion of pressure relief, the skylight is restored under the elastic member 322. When the pressure sensor 37 detects that the negative wind pressure is greater than a preset pressure of the pressure relief device, the elastic member 322 works to drive the skylight 31 to move upward overall, and the pressure is released through the pressure relief hole. When the resulting negative wind pressure is less than a preset pressure of the pressure relief adjustment device 32, the skylight may be damaged. By this time, the elastic member 322 in the pressure relief adjustment device 32 is controlled manually to eject the pressure relief device, and the pressure relief hole is opened to release the pressure, thereby ensuring the desirable bearing capacity of the skylight at the ridge.

The first anti-seepage component 33 is provided at a junction between each of the four sides of the skylight 31 and the lower roof panel 212 to ensure a desirable sealing effect. Through cooperation between the folded plate 331 and the corner splicing member 332, the sealing effect at the junction between the whole skylight 31 and the lower roof panel 212 is ensured. With the fold protruding portion 3313 on the folded plate 331, rainwater can be obstructed by the fold protruding portion 3313. The fold protruding portion 3313 obstructs the rainwater repeatedly, thereby ensuring the sealing effect between the skylight 31 and the lower roof panel. The first flashing 34 can withstand impaction of the rainwater to the junction between the skylight 31 and the lower roof panel 212. The rainwater falls onto the first flashing 34, and is buffered by the first flashing 34 to some extent. Then, the rainwater falls onto the roof from the first flashing 34. It is to be noted that the skylight at each of the flat roof, the sloping roof and the ridge is provided with the first anti-seepage component 33.

In case of the slope and particularly the upslope, the rainwater falls off along the slope from the highest ridge. Hence, anti-seepage fixation is further needed between the skylight 31 at the upslope and the lower roof panel, and the second anti-seepage component 36 is provided under the first flashing 34 on the upslope. The second anti-seepage component 36 is provided at a front end of the first anti-seepage component 33. That is, the rainwater is obstructed for a first time by the anti-seepage plate 361 and the anti-seepage splicing plate 362, and then obstructed for a second time by the first anti-seepage component 33. This can further ensure the sealing effect between the skylight 31 on the upslope and the lower roof panel.

When the gutter system 4 is used, in case of rainy and snowy weathers, rainwater and snow flow to the gutter 41 at the cornice of the roof along the roof. Since the gutter 41 is recessed, and there is a certain height between an interior of the gutter and the cornice of the gutter, an ice piton may be generated at the upper cornice in the rainy and snowy weathers. The cornice snow melting component 43 is provided to remove the ice piton. During removal of the ice piton, high-temperature snow melting can be realized through the heating cable 434 and the thermal conductive gasket 433, and rainwater formed by the snow can flow to the gutter 41 from the second flashing 435 under an action of the cornice cap 431, thereby preventing the ice piton at the upper cornice of the gutter.

The rainwater falling into the gutter 41 may be iced for an outdoor low-temperature environment, and the snow falling into the gutter may be piled. The gutter is located at a high position, and thus it is hard to manually remove the rainwater and the snow. The snow melting in the gutter 41 is realized by the gutter snow melting component in the gutter 41. The snow melting may be specifically realized in two ways, one of which is to provide the heat tape in the gutter to realize the snow melting, and the other is to spray the snow melting agent to the inner wall of the gutter to realize the snow melting.

When the heat tape is used to realize the snow melting in the gutter, whether one gutter heat tape 471 or two gutter heat tape 471 are used can depend on the size of the gutter 41 and the actual situation on the site. In case of the rainy and snowy weathers, the gutter heat tape 471 is started by a heating control module in the indoor roof box. The gutter heat tape 471 heats the gutter 41, thereby realizing the snow melting for the snow or the ice in the gutter. The rainwater formed by the snow or the ice can fall off from the siphonic roof drain 42. When the rainwater enters the siphonic roof drain 42, the downspout heat tape 46 in the downspout 49 also starts to work. The downspout heat tape 46 is also controlled by the roof box. The downspout heat tape 46 can prevent the rainwater from icing in the downspout 49 for the low-temperature environment. At last, the rainwater falls into the ground through the downspout 49. The solar panel 217 provides energy for the downspout heat tape 46 and the gutter heat tape 471.

When the snow melting agent is sprayed to realize the snow melting, the high-pressure nozzles 4722 are provided in the gutter 41 according to the size of the gutter 41 and the actual situation on the site. A plurality of high-pressure nozzles 4722 communicate with each other through the tube 4721, and are connected to the automatic spraying control module and the snowfall sensor 4724. An inlet of the tube 4721 is connected to the external snow melting agent box. In use, the roof box controls the automatic spraying control module 4723 to work. The snow melting agent in the snow melting agent box is conveyed to the tube 4721 under the control of the automatic spraying control module 4723, and sprayed to the gutter 41 from the plurality of high-pressure nozzles 4722 to act on the ice or the snow in the gutter 41, thus realizing the snow melting. The rainwater formed by the snow or the ice can fall off from the siphonic roof drain 42. When the rainwater enters the siphonic roof drain 42, the downspout heat tape 46 in the downspout 49 also starts to work. The downspout heat tape 46 is also controlled by the roof box. The downspout heat tape 46 can prevent the rainwater from icing in the downspout 49 for the low-temperature environment. At last, the rainwater falls into the ground through the downspout 49. The solar panel 217 provides energy for the downspout heat tape 46, the automatic spraying control module 4723 and the snowfall sensor 4724.

The foregoing embodiments are only used to explain the technical solutions of the present disclosure, and are not intended to limit the same. Although the present disclosure is described in detail with reference to the foregoing embodiments, those of ordinary skill in the art should understand that they can still modify the technical solutions described in the foregoing embodiments, or perform equivalent substitutions on some technical features therein. These modifications or substitutions do not make the essence of the corresponding technical solutions deviate from the spirit and scope of the technical solutions of the embodiments of the present disclosure.

What is claimed is:

1. A roof system, comprising a roof body allowed for forming a flat roof or a corrugated roof, and the roof body being provided on a roof pillar, wherein a gutter system is provided at a valley position of the corrugated roof or on the flat roof; a skylight system is further provided at a pitched roof or a ridge of the corrugated roof or on the flat roof; and a pressure relief adjustment component is provided on the skylight system; and the roof body is assembled by a plurality of roof modules; first two adjacent roof modules along a roof span direction are assembled through a connecting plate; two ends of the connecting plate are respectively lapped on the first two adjacent roof modules; the connecting plate and the first two adjacent roof modules are fixed by a self-locking component; and second two adjacent roof modules along a direction perpendicular to the roof span direction are further fixed by the self-locking component.

2. The roof system according to claim 1, wherein the plurality of roof modules each sequentially comprise a support beam, a lower roof panel, reinforcing components, an upper roof panel, the self-locking component, and a solar component from bottom to top; the support beam is provided at a bottom of the lower roof panel; the reinforcing components are provided in a frame shape at a middle position of a top of the lower roof panel; and a heat-preserving vapor barrier component is provided inside the reinforcing components and on the lower roof panel; and the two ends of the connecting plate are respectively lapped on two adjacent upper roof panels; the connecting plate and the two adjacent upper roof panels are fixed by the self-locking component; and a bridge reinforcing member is further clamped on the connecting plate and at a top of the upper roof panel.

3. The roof system according to claim 2, wherein the self-locking component comprises a support clamping groove and a fixed support; a contour of the fixed support matches with the support clamping groove; and edges at two sides of the upper roof panel are limited between the support clamping groove and the fixed support.

4. The roof system according to claim 3, wherein the self-locking component further comprises an outer clamping member and an inner clamping member; the outer clamping member comprises an inner clamping groove; the inner clamping member comprises a clamping key matching with the inner clamping groove; the clamping key is inserted into the inner clamping groove to enclose the support clamping groove; and a top protrusion of the outer clamping member wraps the inner clamping member from an upside of the inner clamping member.

5. The roof system according to claim 3, wherein the fixed support comprises a transverse locating plate and a vertical limiting rod perpendicular to the transverse locating plate; the vertical limiting rod is a gradually narrow structure from top to bottom; inclined triangular brackets at two sides of a bottom of the vertical limiting rod are fixed to the transverse locating plate; a top of the vertical limiting rod is a first curved protrusion; a first recessed segment and a first raised segment are provided sequentially downward along two sides of the first curved protrusion to form a first multi-segment structure; and the first multi-segment structure is integrally formed with the vertical limiting rod.

6. The roof system according to claim 5, wherein the edges at the two sides of the upper roof panel match with the vertical limiting rod in shape; the top of the upper roof panel is a second curved protrusion; a second recessed segment and a second raised segment are provided sequentially downward along two sides of the second curved protrusion to form a second multi-segment structure; and the second multi-segment structure is integrally formed with the upper roof panel.

7. The roof system according to claim 2, wherein a waterproof strengthening component is provided between two middle ones of the reinforcing components; the reinforcing components each comprise two fastening beams, sliding rods, and sliders; the two fastening beams are provided on the lower roof panel in parallel; a plurality of sliders are provided on each fastening beam; and two ends of each sliding rod are respectively detachably connected to the sliders on the two fastening beams.

8. The roof system according to claim 7, wherein a spacing between the two fastening beams is controlled by a first adjustment structure; and a spacing between two sliding rods is controlled by a second adjustment structure.

9. The roof system according to claim 8, wherein the first adjustment structure comprises serrated runners respectively provided on sidewalls at the two ends of the sliding rod; a groove is formed in a top of the slider; the groove is fittingly connected to the sliding rod in a sliding manner; serrated pin holes are respectively formed at a front side and a rear side of the slider; and the serrated pin hole and the serrated runner are locked by a serrated pin; and the second adjustment structure comprises a plurality of locating pin holes equidistantly formed at two sides of the fastening beam; a steel groove is formed in a bottom of the slider; the steel groove is connected to the fastening beam in the sliding manner; butterfly pin holes are further respectively formed at a left side and a right side of the slider; and the butterfly pin hole is locked with the locating pin hole in the fastening beam by a butterfly pin.

10. The roof system according to claim 2, wherein the solar component comprises two mounting stands provided at a top of the self-locking component in parallel; nested plates are respectively detachably provided on the two mounting stands; and a solar panel is clamped in the nested plates.

11. The roof system according to claim 1, wherein the skylight system comprises a skylight; the pressure relief adjustment component is provided at each of four corner positions of the skylight; and a pressure sensor is further provided on the skylight; and the pressure relief adjustment component comprises an inner nested rod and an outer sleeve; a top of the inner nested rod is connected to a square tube; a bottom of the outer sleeve is fixed to the roof body; a bottom of the inner nested rod is connected in the outer sleeve in a sliding manner; a pressure relief hole is formed in the outer sleeve; an upper portion of the outer sleeve is connected to the square tube through an elastic member; and a top of the square tube is fixed to the skylight.

12. The roof system according to claim 11, wherein the pressure relief adjustment component further comprises a single plate and a support plate; one end of the single plate is connected to the square tube through the support plate; and the square tube is provided at a side of the skylight; and a gasket is further provided at a contact position between the inner nested rod and the outer sleeve; the gasket is fixed on an inner wall of the outer sleeve; and the gasket is located under the pressure relief hole.

13. The roof system according to claim 11, wherein four sides of the skylight each are provided with a first flashing; and a top of the first flashing is fixed to the outer sleeve.

14. The roof system according to claim 11, wherein a bottom of each of four sides of the skylight is fixed to the roof body through a first anti-seepage component; the first anti-seepage component comprises a folded plate and a corner splicing member; the folded plate is located at the bottom of the each of the four sides of the skylight; the folded plate comprises a first end fixed to the skylight, and a second end fixed to the roof body; and a corner splicing position between two adjacent folded plates is fixed by the corner splicing member.

15. The roof system according to claim 14, wherein the folded plate comprises a skylight welding portion, a vertical lapping portion, a fold protruding portion, and a roof welding portion, the skylight welding portion, the vertical lapping portion, the fold protruding portion, and the roof welding portion are formed integrally; the fold protruding portions and the roof welding portion are respectively provided at two ends of the folded plate; the skylight welding portion is fixed to the bottom of the each of the four sides of the skylight; the roof welding portion is fixed to the roof body; an end of the fold protruding portion is fixed to the corner splicing member; and the vertical lapping portion is provided between the fold protruding portion and the roof welding portion, and is arc-shaped to be fixed to the corner splicing member.

16. The roof system according to claim 14, wherein the corner splicing member comprises an upper connecting portion and a curved lapping portion; the upper connecting portion is provided at a top of the curved lapping portion; the upper connecting portion comprises two welding edges perpendicular to each other; the two welding edges are fixed to bottoms of two sides of the skylight; and the curved lapping portion is connected to the two adjacent folded plates.

17. The roof system according to claim 11, wherein the skylight system on the pitched roof further comprises a second anti-seepage component provided at a junction between the skylight and an upslope of the pitched roof; the second anti-seepage component comprises an anti-seepage plate and an anti-seepage splicing plate; and the anti-seepage plate comprises a first end connected to a side of the skylight, and a second end fixed to the roof body through the anti-seepage splicing plate.

18. The roof system according to claim 1, wherein the gutter system comprises a gutter provided at the valley position of the corrugated roof or on the flat roof; a thermal conductive plate is provided on an inner bottom wall of the gutter; a cornice snow melting component is provided at an upper cornice of the gutter; a rainwater inlet is formed in the inner bottom wall of the gutter; a water pressure monitor is provided on a sidewall of the gutter; a siphonic roof drain is provided at the rainwater inlet; and a gutter snow melting component is further provided inside the gutter; and a downspout heat tape is further provided in the siphonic roof drain.

19. The roof system according to claim 18, wherein the siphonic roof drain comprises a conical drainage portion, a gasket, an oblique spiral portion, and a water outlet; the gasket further comprises an expandable layer and a honeycomb waterproof layer; the expandable layer is located outside the honeycomb waterproof layer; a top of the oblique spiral portion is provided with the conical drainage portion; the gasket is located outside the oblique spiral portion; and the oblique spiral portion communicates with the water outlet; and the water outlet is inserted into a downspout at a bottom of the gutter; the downspout heat tape is provided in the downspout; a junction box is provided on an inner wall of the gutter; and the downspout heat tape is connected to the junction box.

20. The roof system according to claim 18, wherein the gutter snow melting component comprises a gutter heat tape and a "snakelike" groove formed in the thermal conductive plate; and the gutter heat tape is provided in the "snakelike" groove.

* * * * *